United States Patent [19]
Luebke et al.

[11] Patent Number: 5,172,682
[45] Date of Patent: Dec. 22, 1992

[54] COMMERCIAL HOT AIR IMPINGEMENT COOKING APPARATUS

[75] Inventors: Clement J. Luebke, Burlington, Vt.; Gerald W. Sank, Pasadena, Md.; Frank A. Slade, Mountain Top, Pa.

[73] Assignee: Welbilt Corporation, New Hyde Park, N.Y.

[21] Appl. No.: 757,236

[22] Filed: Sep. 10, 1991

Related U.S. Application Data

[62] Division of Ser. No. 593,246, Oct. 5, 1990, Pat. No. 5,050,578, which is a division of Ser. No. 279,094, Dec. 2, 1988, Pat. No. 4,972,824.

[51] Int. Cl.$^5$ .......................... F24L 15/32; A21B 1/08
[52] U.S. Cl. .......................... 126/21 A; 126/21 R; 99/433 R; 99/414; 99/444; 219/400
[58] Field of Search ............. 126/21 A, 332, 337 R, 126/339, 273 R, 273 A, 19 R, 21 R; 99/444, 445, 473, 474, 476, 414, 443; 219/400, 388, 365, 540, 370

[56] References Cited

U.S. PATENT DOCUMENTS

| | | | |
|---|---|---|---|
| 3,828,760 | 8/1974 | Farber et al. | 126/21 A |
| 3,908,533 | 9/1975 | Fagerstrom et al. | 99/386 |
| 3,978,843 | 9/1976 | Durth | 126/21 A |
| 4,395,233 | 7/1983 | Smith et al. | 126/21 A X |
| 4,455,478 | 6/1984 | Guibert | 126/21 A X |
| 4,824,644 | 4/1989 | Cox et al. | 126/21 A X |
| 4,829,158 | 5/1989 | Burnham | 126/21 A X |
| 4,867,132 | 9/1989 | Yencha | 126/21 A |

*Primary Examiner*—Larry Jones
*Attorney, Agent, or Firm*—Hubbard, Thurman, Tucker & Harris

[57] ABSTRACT

Various representative commercial cooking devices are disclosed wherein a recirculating flow of heated air, at a food cooking temperature, is created within a housing in which a horizontally disposed food support and cooking member, such as a perforated metal plate, a solid griddle plate or a metal broiling grate, is positioned. A plenum structure is utilized to convert a portion of the continuously recirculated air into a spaced series of relatively high velocity heated air impingement jets which are caused to laterally diffuse and at least slightly overlap prior to striking at least one side surface of the food support structure. In this manner, each food support structure side surface subjected to such diffused jet impingement is evenly blanketed with heating air to thereby very uniformly transfer heat from the air to the food support structure, and thus to the food supported thereby, at an accelerated rate.

13 Claims, 15 Drawing Sheets

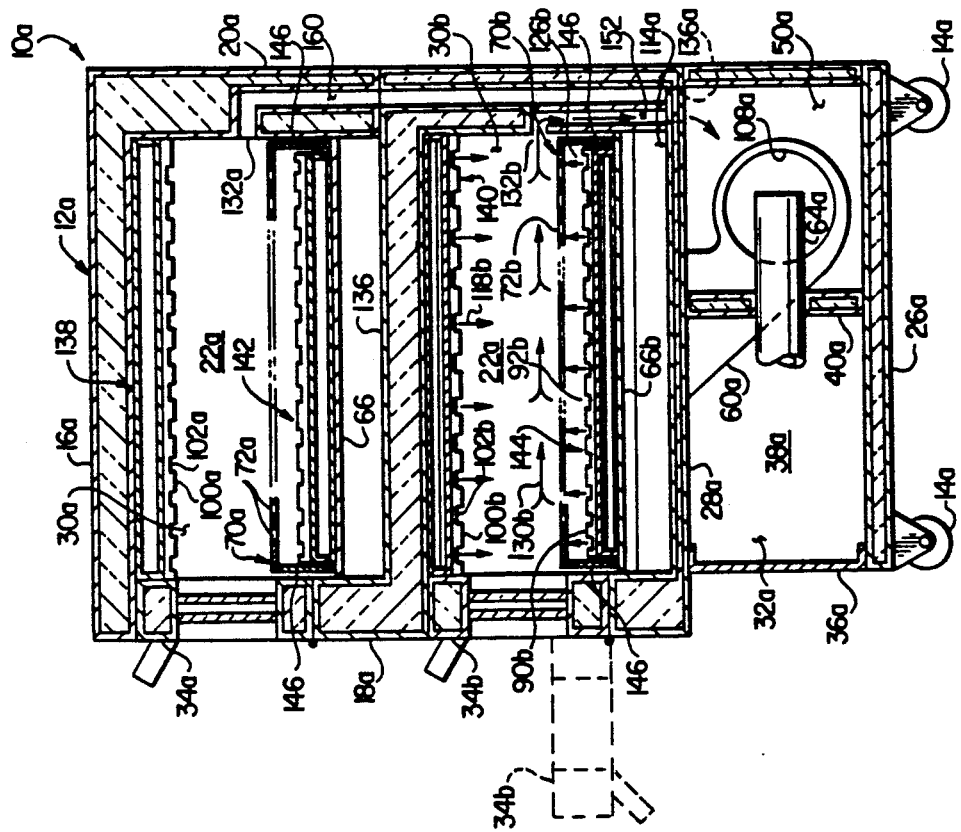
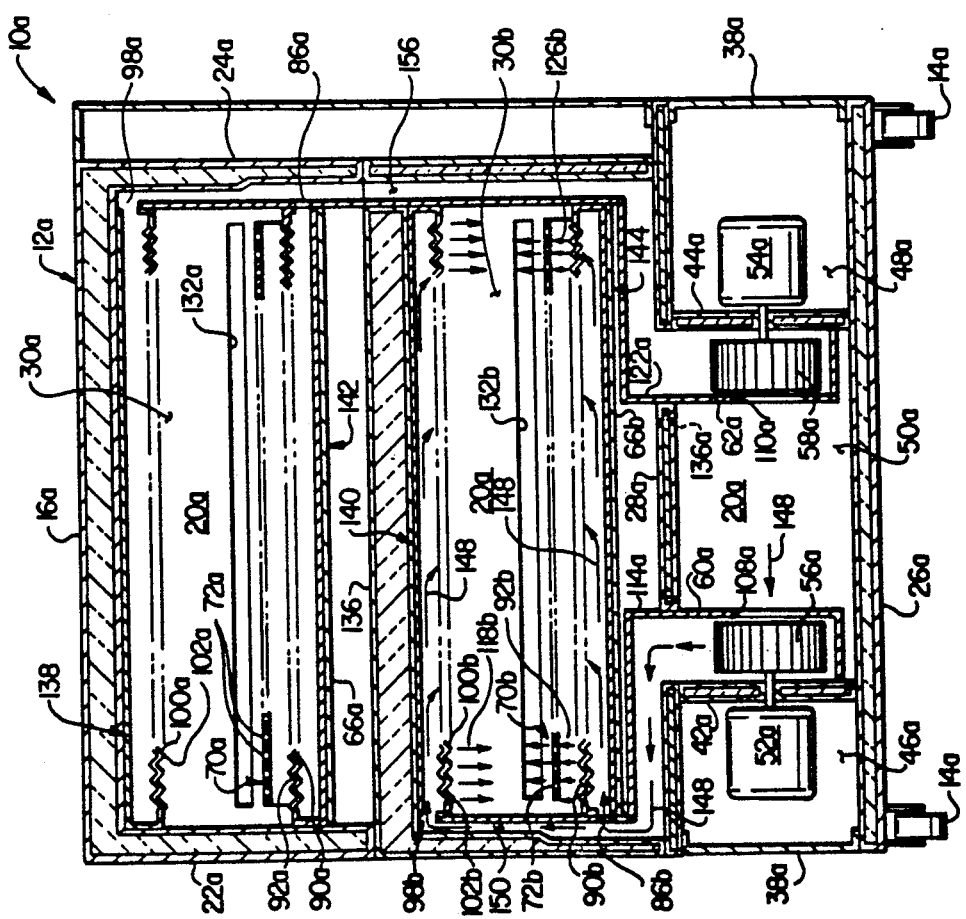

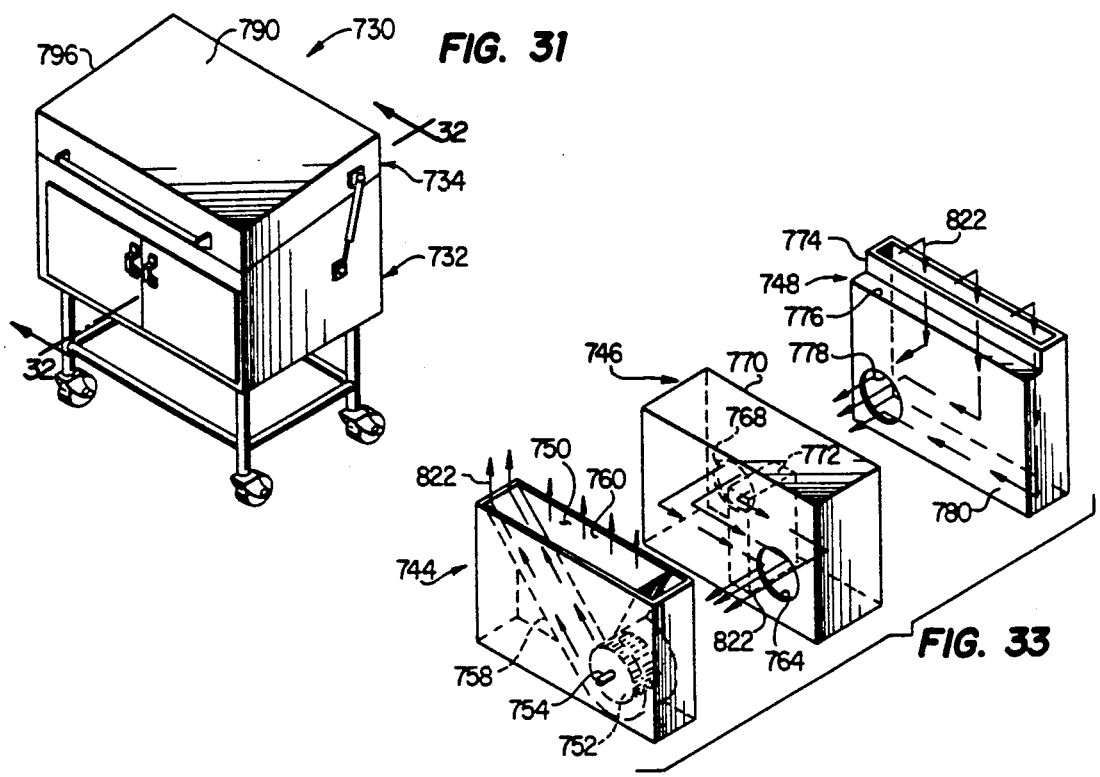

COMMERCIAL HOT AIR IMPINGEMENT COOKING APPARATUS

This application is a division of application Ser. No. 593,246, filed Oct. 5, 1990, now U.S. Pat. No. 5,050,578, which is a division of Ser. No. 279,094, filed Dec. 2, 1988, now U.S. Pat. No. 4,972,824.

BACKGROUND OF THE INVENTION

The present invention relates generally to cooking apparatus and, in various preferred embodiments thereof, more particularly provides commercial hot air impingement cooking apparatus which, compared to conventional commercial cooking devices such as pizza hearth ovens, frying griddles, convection ovens and broiling grills, provides a variety of advantages.

Conventional commercial cooking devices of the types representatively listed above are subject to a variety of well known disadvantages and limitations including relatively high fabrication and operating costs, lengthy pre-cooking warmup time, undesirable variation in batch-to-batch cooking times, uneven heat transfer to the food items being cooked, and/or the inability to vary the relative cooking rates of upper and lower portions of the food items.

A prime example of a commercial cooking device which is subject to a variety of these disadvantages and limitations is the stone hearth oven used to cook pizzas. The stone hearths used in these ovens to support and cook the pizzas is typically approximately 1½" thick and takes approximately two hours to be preheated from room temperature to its approximately 500° F. operating temperature. Because of this elongated warmup time, it is conventional practice, while the pizza establishment is closed during the night, to very uneconomically maintain the oven at a holding temperature of approximately 300° F. so that the warmup time at the beginning of the next business day is reduced to an acceptably short time.

Because of the very substantial thermal lag unavoidably associated with these thick stone hearths, there is a substantial variation in batch cooking times. For example, the first batch of pizzas cooked in a given business day, after the stone hearth has been preheated to its 500° F. operating temperature, takes approximately 10 minutes. However, the next batch typically takes approximately 12 minutes, and the succeeding batches take approximately 15 minutes each.

Additionally, there is typically no provision for varying the relative cooking rates of the pizza crust and its topping ingredients.

It is accordingly an object of the present invention to provide improved commercial cooking apparatus which eliminates or minimizes above-mentioned and other disadvantages and limitations typically associated with commercial cooking devices such as pizza ovens, frying griddles, convection ovens and broiling grills.

SUMMARY OF THE INVENTION

In carrying out principles of the present invention, a variety of representative commercial cooking apparatus embodiments are provided in which a recirculating flow of heated air is created within a housing having at least one relatively large area food support and cooking structure horizontally disposed therein. Plenum means are vertically spaced apart from the food support structure and function to convert a portion of the recirculating air into a spaced series of relatively high velocity vertically directed heated air jets which transversely impinge upon at least one of the opposite side surfaces of the food support and cooking structure.

The jets are caused to laterally diffuse and at least slightly overlap prior to striking their associated food support structure side surface, thereby evenly blanketing such side surface with transversely directed heated impingement air. In this manner, heat from the recirculating air is very evenly transferred to the food support structure, and to food items supported thereby, at an accelerated rate to very uniformly and rapidly cook the food items regardless of their positions on the food support structure, and without the necessity of moving the food items during the cooking process.

In the present invention, this very even distribution of heating air jet impingement flow is incorporated in the following representative embodiments:

1. Various single and multi-tier pizza cooking ovens in which the food support structures are perforated thin metal cooking plates and the uniformly distributed impingement jet flow is directed against the opposite upper and lower side surfaces of each plate;

2. A countertop oven in which the food support structure is a thin metal perforated plate and the uniformly distributed impingement jet flow is directed against the opposite upper and lower side surfaces of the plate;

3. Half-sized convection ovens in which the food support structures are metal cooking racks each positioned between oppositely directed series of laterally diffussing heated air impingement jets;

4. An air impingement frying griddle in which the underside of a large area, relatively thin metal griddle plate is subjected to the aforementioned evenly distributed flow of laterally diffusing heated air impingement jets;

5. A dual griddle impingement air cooker in which the food items are positioned between upper and lower relatively thin metal griddle plates positioned between oppositely directed series of laterally diffusing heated air impingement jets; and 6. A clamshell grill in which the food items being cooked are pressed between upper and lower metal grate members which are positioned between oppositely directed series of laterally diffusing heated air impingement jets.

BRIEF DESCRIPTION OF THE DRAWINGS

FIGS. 6 and 7 are cross-sectional views, respectively similar to those in FIGS. 3 and 2, through a double tier embodiment of the slot oven with its lower tier being operated;

FIG. 31 is a perspective view of a clamshell grill embodiment of the present invention;

FIG. 32 is an enlarged scale cross-sectional view through the grill taken along line 32—32 of FIG. 31; and FIG. 33 is an exploded perspective view of drop-in air return, heating, and air supply sections used in the grill.

DETAILED DESCRIPTION

Figure 1:
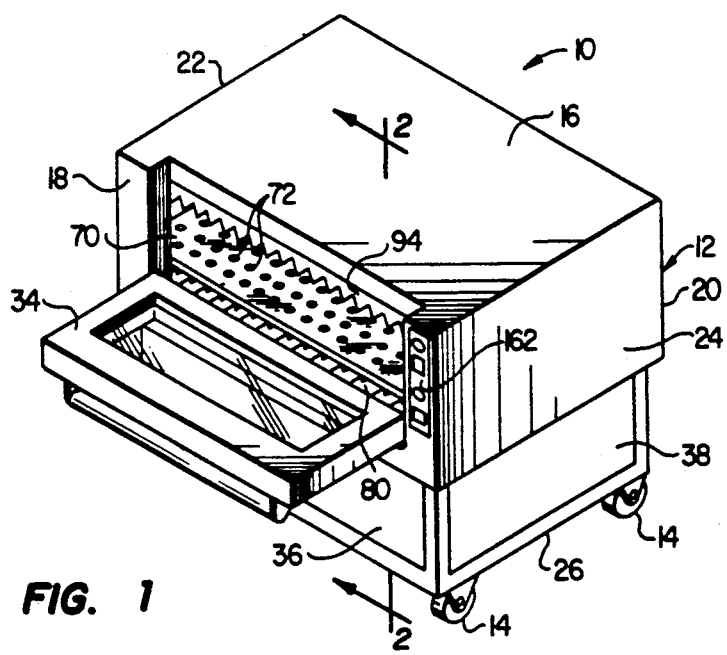
FIG. 1 is a perspective view of a single tier pizza cooking slot oven embodiment of the present invention.

The present invention, in various preferred embodiments thereof, provides commercial recirculating hot air impingement apparatus used to cook a variety of food items. As will be seen from the detailed descriptions of the representative invention embodiments set forth below, a central theme of the present invention is the use of a recirculated flow of heated air to create a very evenly distributed transverse flow of relatively high velocity heated impingement air onto at least one generally horizontal side surface of a large area, heat conducting food support structure from one or more supply plenum devices vertically spaced apart from the food support structure.

Air delivery from the supply plenum devices is preferably in the form of a mutually spaced series of heated impingement air jets which are caused to laterally expand or "plume" prior to transversely striking their associated side surface of the food support structure (and, as the case may be, the supported food product as well) in a manner such that essentially the entire area of such side surface above or below the supply plenum device is evenly "blanketed" with transversely directed impingement cooking air.

This very uniform horizontal distribution of transversely directed impingement cooking air across essentially the entire vertically projected area of the food support structure side surface or surfaces above or below the plenum provides a variety of advantages over conventional commercial cooking devices used to cook the same products. For example, it permits the food support structure to take the form of a thin metal plate (either solid or perforated, depending on the particular cooking application) having a very low mass compared to conventional food support structures such as stone pizza cooking hearths, thick metal frying griddles and the like. Coupled with the transverse air impingement and its even distribution across the quite large cooking areas commonly provided in commercial cooking devices, the thin plate provides for much more rapid and even heat transfer to the food product being cooked, thereby markedly reducing cook cycle and heat up times. While the thin plate configuration of the food support structure provides a variety of benefits, the air impingement and distribution principles of the present invention may also be advantageously utilized in conjunction with more massive food support structures such as metal grill grates.

An important additional advantage of the present invention is that the food product being cooked does not in any manner have to be moved transversely to the air impingement jets during the cooking process to assure even cooking of the food. Moreover, regardless of the position on the large area food support structure that a particular food item is placed, it will be rapidly and very uniformly cooked while in a stationary position within the particular cooking apparatus.

The very simple air-only heating scheme employed in the present invention also permits the various commercial cooking devices described below to be, in most instances, constructed at a significantly lower cost than conventional commercial apparatus used to cook the same food products.

Importantly, however, the various benefits described above are achieved in the present invention without in any manner reducing the quality of the cooked food end product. Indeed, it has been found in developing the present invention that such quality is, in many instances, significantly enhanced. Turning now to the drawings, various preferred embodiments of the present invention will be described in detail.

Pizza Cooking Slot Oven

Figure 2:
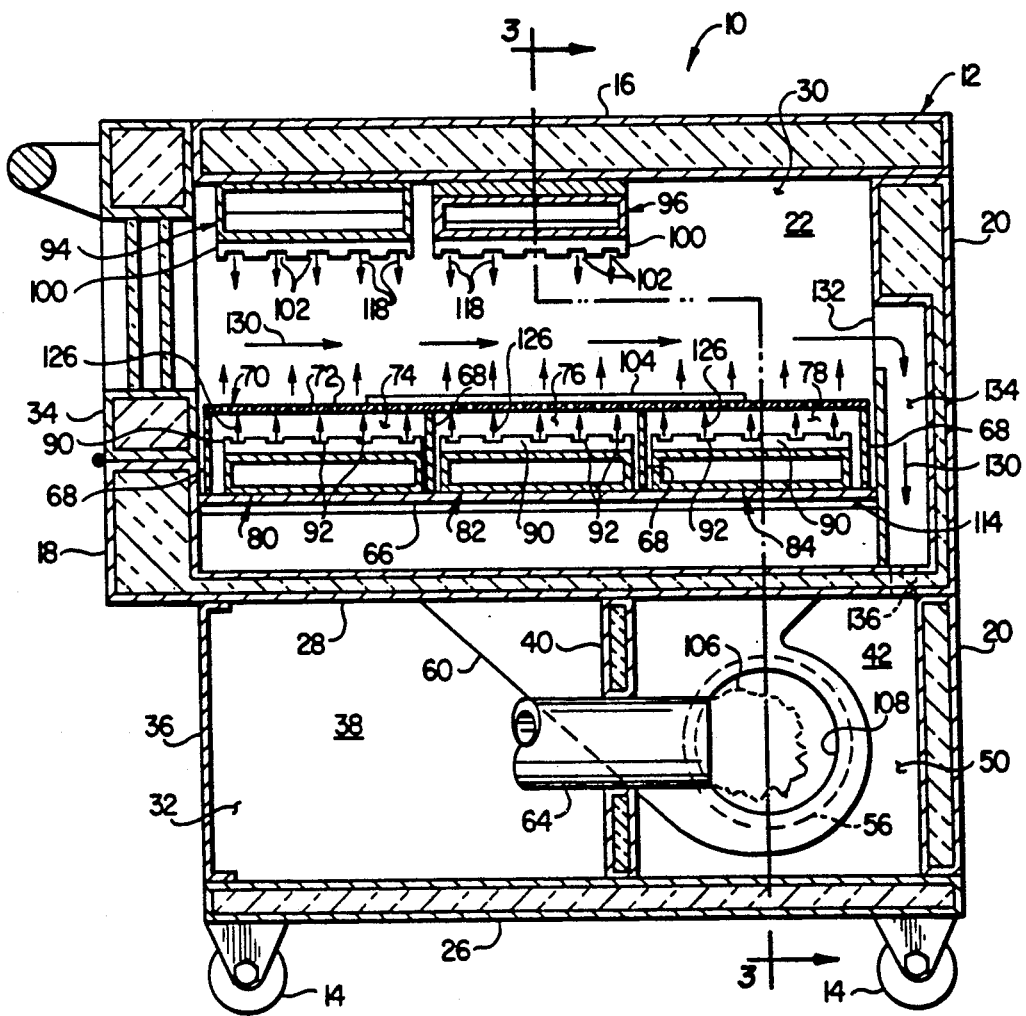
FIG. 2 is an enlarged scale cross-sectional view through the slot oven taken along line 2—2 of FIG. 1.
Figure 3:
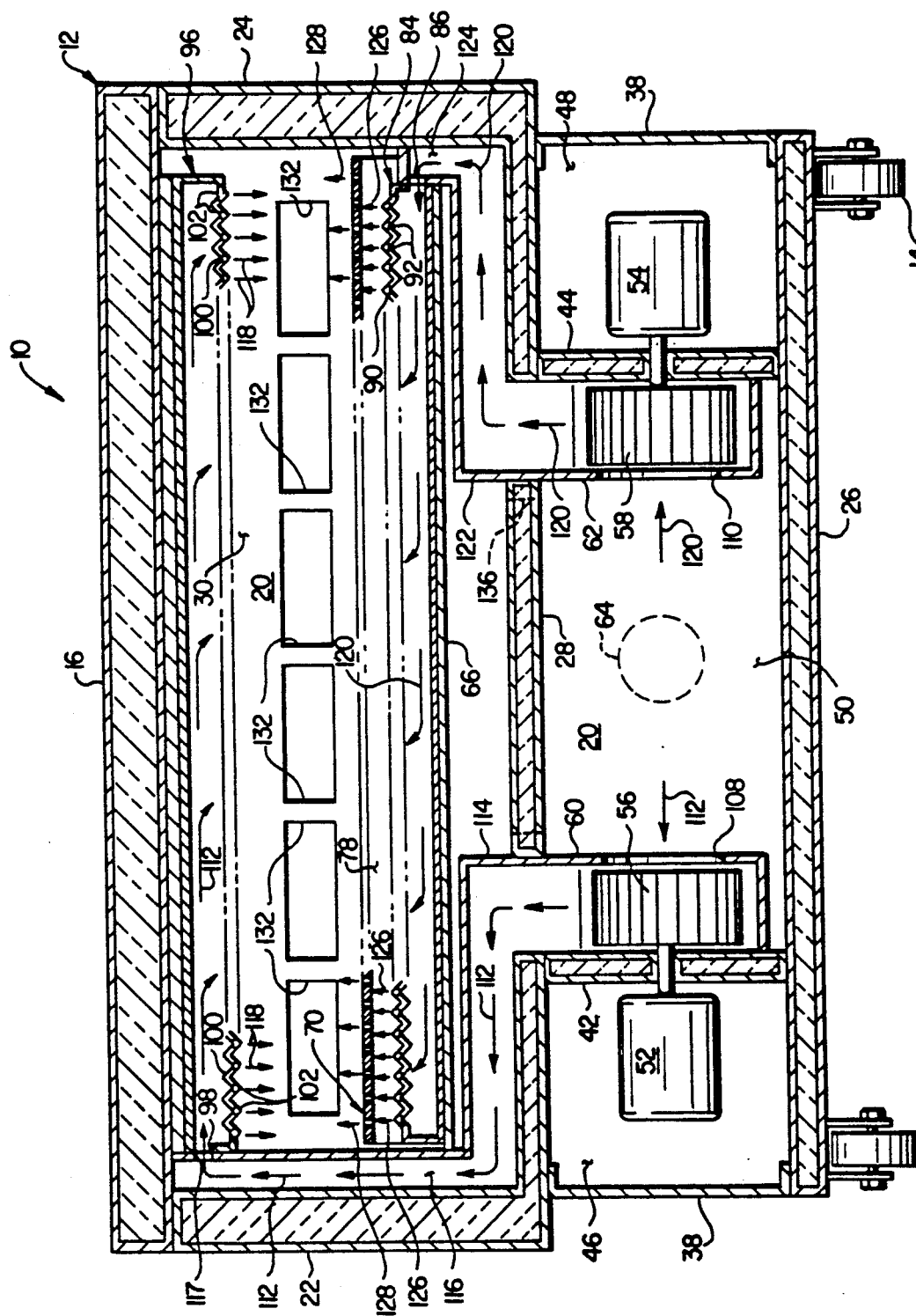
FIG. 3 is a cross-sectional view through the slot oven taken along line 3—3 of FIG. 2.

The single tier pizza cooking slot oven 10 illustrated in FIGS. 1-3 comprises a housing 12 which is floor supportable on wheels 14 or legs and is provided with internally insulated, double sided exterior walls including top wall 16, front wall 18, rear wall 20, left side wall 22, right side wall 24, and bottom wall 26. A horizontally extending, vertically intermediate wall 28 divides the housing interior into an upper section having a cooking chamber 30 therein, and a lower section having a heating and air supply chamber 32 therein. Access to the cooking chamber 30 is provided by a swing-down closure and observation door 34 mounted on front wall 18, and access to the lower chamber 32 is provided by front and side access panels 36 and 38.

Within the lower housing section, a vertical dividing wall 40 extending between the opposite side walls of the lower housing section cooperates with a pair of dividing walls 42 and 44 extending rearwardly from the wall 40 to the rear housing wall 20 to define within the chamber 32 left and right fan motor chambers 46 and 48 (FIG. 3) at the rear corners of the lower housing section, and a heating chamber 50 positioned between the fan motor chambers 46 and 48. A pair of fan motors 52 and 54 are respectively supported within the chambers 46 and 48, and are used to drive centrifugal fan impellers 56 and 58 positioned within fan discharge plenums 60 and 62 supported within the heating chamber 50 on the dividing walls 42 and 44. A suitable fuel burner 64 or electric element package (not illustrated) is extended through the dividing wall 40 into the heating chamber 50 and is utilized to supply heat thereto for purposes subsequently described.

Spaced upwardly from the intermediate wall 28 is a horizontal support wall 66. Secured to wall 66, and extending upwardly therefrom, are four elongated divider plates 68 which longitudinally extend in a left-to-right direction across the cooking chamber 30. The upper side edges of the plates 68 support a thin metal cooking support plate or deck 70 having a series of circular holes 72 formed transversely therethrough. In the illustrated preferred embodiment of the perforated deck 70, its thickness is approximately 1/16", and the holes 72 have ¼" diameters and are spaced apart on staggered ½" centers.

Deck 70 defines with the divider plates 68 and the support wall 66 front, center and rear baffle plenums 74, 76 and 78. Respectively supported on the wall 66 within the baffle plenums 74, 76 and 78 are three elongated metal supply plenum boxes 80, 82 and 84 which are each spaced downwardly from the deck 70. These lower supply plenum boxes 80, 82 and 84 are of identical construction which will now be described with reference to the supply plenum box 84 perspectively illustrated in FIG. 4.

Supply plenum box 84 is of a hollow, elongated rectangular configuration and has an inlet opening 86 formed in its right end wall 88. The elongated rectangular top wall of the plenum box 84 is provided with transversely extending corrugations as illustrated, the corrugations having a spaced series of generally V-shaped, upwardly projecting ridges 90. A spaced series of elongated rectangular air discharge slots 92 are formed in each of the ridges 90.

Supported from the top housing wall 16 in a vertically spaced relationship with the deck 70 are a pair of supply plenum boxes 94 and 96. The upper plenum box 94 is positioned over the front lower plenum box 80, while the upper plenum box 96 is positioned over the lower center plenum box 82. Upper plenum boxes 94, 96 are substantially identical in configuration to the lower plenum boxes except that their inlet openings 98 (FIG. 3) are positioned in their left end walls, and the interior cross section of the plenum box 94 is substantially larger than the interior cross sections of the other four plenum boxes. The lower side walls of the upper plenum boxes 94, 96 are transversely corrugated and are provided with downwardly projecting ridges 100 having elongated rectangular air discharge slots 102 formed therein.

During operation of the pizza cooking slot oven 10, with a pizza 104 supported on the perforated deck 70, air within the heating chamber 50 (FIG. 3) is heated by the products of combustion 106 (FIG. 2) emanating from the burner 64 or electric elements (not illustrated) and is drawn into the fans 56 and 58 through inlet openings 108 and 110 formed in the fan discharge plenums 60 and 62. Heated air 112 entering the inlet opening 108 is discharged by the fan 56 through a supply duct 114 that extends upwardly through the wall 28 and extends below the support wall 66 to a vertical supply passage 116 formed inwardly along the left housing side wall 22. Heated air 112 upwardly traversing the supply passage 116 is forced into the inlet openings 98 of the upper supply plenum boxes 94 and 96 via discharge openings 117. The heated air 112 forced into the interior of the upper supply plenum boxes 94 and 96 is discharged downwardly through their ridge slots 102 in the form of relatively high velocity heated air jets 118 which, in a manner subsequently described, laterally diffuse and impinge upon the upper surface of the pizza 104 and the deck 70 in a manner evenly blanketing the portions of such surfaces beneath plenum boxes 94, 96 with a transverse flow of heated impingement air.

Heated air 120 (FIG. 3) entering the fan 58 is discharged therefrom through a supply duct 122 that extends upwardly through the wall 28 and extends below the support wall 66. Duct 122 terminates at a vertical supply passage 124 that extends upwardly along the inner surface of the right housing wall 24 and terminates at the inlet openings 86 of the lower supply plenum boxes 80, 82 and 84. Heated air 120 forced into the interior of these lower supply plenum boxes is upwardly discharged therefrom, through their ridge slots 92, in the form of relatively high velocity heated air jets 126.

Figure 4:
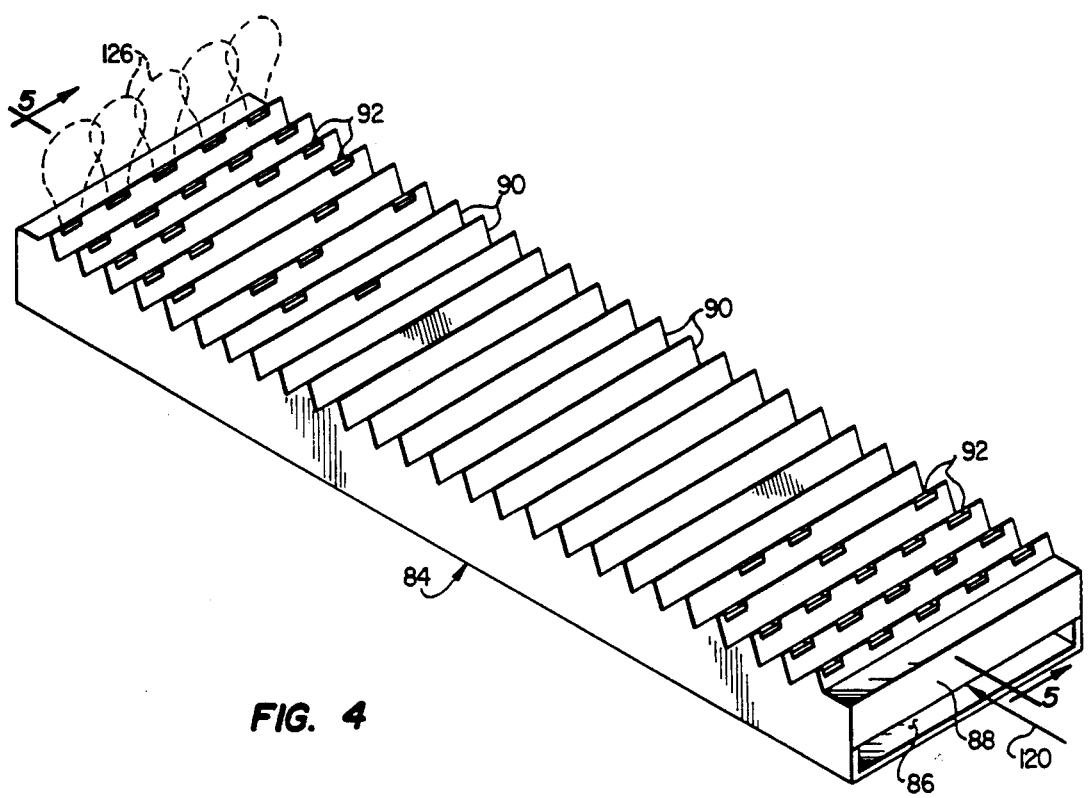
FIG. 4 is an enlarged scale perspective view of one of the heated air supply plenum structures used in the slot oven.
Figure 5:
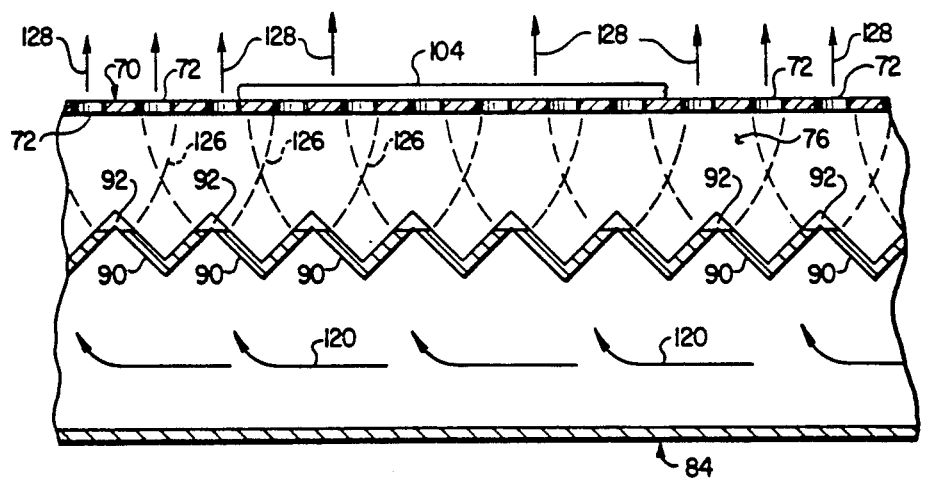
FIG. 5 is a partial cross-sectional view through the supply plenum structure, taken along line 5—5 of FIG. 4, and illustrates its operation in conjunction with a perforated food support and cooking plate portion of the slot oven.

As illustrated in FIGS. 4 and 5, these upwardly directed jets 126 laterally diffuse, or "plume", prior to striking the underside of the perforated deck 70. The jets 126 thus tend to at least somewhat overlap prior to transversely striking the underside of the deck 70, thereby evenly blanketing the deck underside with heated impingement air. In a similar fashion, the downwardly directed upper jets 118 (FIGS. 2 and 3) laterally diffuse in a manner evenly blanketing the upper surface portions of the deck and the pizza 104 beneath the upper plenum boxes with transversely directed heated impingement air.

A portion of the diffused jets 126 striking the underside of the deck 70 pass through underlying deck openings 72 onto the underside of the pizza 104, while the balance of the diffused jets 126 are forced upwardly through others of the holes 72 in the form of upwardly directed air streams 128. The air streams 128, and the downwardly directed jets 118 after they have impinged upon the upper surfaces of the pizza and the deck 70, are drawn rearwardly, as return air 130, (FIGS. 2 and 3) into a series of horizontally elongated rectangular return openings 132 formed in the interior side surface of the rear housing wall 20 between the deck 70 and the upper supply plenum boxes 94 and 96. Return air 130 entering the openings 132 is drawn downwardly through a vertical return passage 134, formed in the rear housing wall 20, and into the heating plenum 50 via an elongated return slot 136 formed in the intermediate wall 28. Return air entering the heating chamber 50 is heated by the burner 64 or electric elemens (not illustrated) and drawn into the fans 56 and 58 to maintain the recirculating flow of heated air through the housing 12 as previously described.

The diffused, evenly blanketed transverse impingement of the jets 92 and 118 on the opposite sides of the perforated deck 70 and the upper side surface of pizza 104, and the horizontal return air flow over the top of the pizza, function to very uniformly cook the pizza in a fraction of the time required by conventional stone hearth cooking ovens. The combination of this diffused, vertical impingement, which accelerates heat transfer to the pizza 104, and the generally horizontal flow of return air 130 across the top of the pizza 104, provides this significantly reduced cooking time, while at the same time maintaining a very high quality in the finally cooked pizza.

The perforated deck 72 is of a larger-than-standard commercial size (56" wide by 36" deep in the illustrated embodiment), and the housing 12 is of a standard commercial size (approximately 63" wide, 45" deep and 51" high) so that the slot oven 10 may be easily and quickly used to replace a standard stone hearth pizza oven.

The oven 10 provides a variety of advantages over conventional stone hearth pizza cooking ovens. The standard pizza oven now widely in use utilizes a 48" by 36" stone hearth cooking deck which typically has a 1½" thickness. Typically, no more than four 16" diameter standard pizzas can be efficiently cooked on the stone hearth. However, despite its standard sized floor "footprint", the oven 10 of the present invention can simultaneously cook six standard 16" diameter pizzas on its enlarged 56" by 36" perforated deck.

In the standard pizza oven, its stone cooking hearth typically requires a warmup time of approximately two hours to be heated from room temperature to the typical operating temperature of approximately 500° F. As a practical matter, in most conventional pizza operations, the stone hearth oven in continuously operated at a reduced temperature (approximately 300° F.) when the establishment is closed to reduce this rather lengthy warmup time on the next business day. In sharp contrast, the pizza cooking oven 10 of the present invention may be heated from room temperature to a similar 500° operating temperature in approximately 30 minutes. This very significantly reduces the total warmup and cooking time for the first batch of pizzas cooked in a given business day. It also eliminates the necessity to operate the oven at an intermediate holding temperature when the pizza establishment is closed. The oven 10 can simply be turned on approximately one half hour before the establishment opens, and will be brought from room temperature to the approximately 500° F. operating temperature when the business day starts.

In the conventional stone hearth oven, the very first batch of four pizzas is typically cooked in approximately 10 minutes. However, the second batch of four pizzas typically takes approximately 12 minutes, due to the thermal lag inherent in the stone hearth, and subsequent four-pizza batches take approximately 15 minutes each. However, in the oven 10 of the present invention, due to the very rapid heat up of the thin metal perforated deck, the first and each succeeding batch of six pizzas are cooked in approximately 6 minutes-there is no corresponding increase in the batch cooking times as in the case of the conventional stone hearth oven.

Importantly, due to the fact that the oven 10 of the present invention is able to cook half again as many pizzas in a given batch as a conventional stone hearth oven, and, on the average, cooks the pizzas in somewhat less than half the time, the production capacity of the oven 10 is at least twice and potentially three times that of the conventional stone hearth oven.

It is also important to note that in the conventional stone hearth oven, it is not feasible to vary the amount of heat transferred to the pizza crust from the stone hearth relative to the amount of heat transferred to the top of the pizza from radiation within the oven. However, in the oven 10 of the present invention, this variation in upper side heat transfer to the pizza versus lower side heat transfer from the metal deck, can be very easily varied simply by selectively varying the air delivery from the fans 56 and 58. For example, to increase the relative heating of the upper side of the pizza, the speed of fan 56 is simply increased. In a similar fashion, to increase the metal deck heat to the pizza crust, the speed of the fan 58 is increased.

While particularly well suited to the cooking of pizzas, the oven 10 is also quite well suited to cooking a variety of other food products ranging from pastry items to a variety of meat products.

Cross-sectionally illustrated in FIGS. 6-9 is an alternate, dual tier embodiment $10_a$ of the previously described slot oven 10. For purposes of comparison, the reference numerals of the elements of oven $10_a$ similar to those in oven 10 have been given the subscript "a" or "b". The slot oven $10_a$ is generally similar in operation to the previously described oven 10 except that the housing $12_a$ is provided with an insulated dividing wall 136 which divides the upper housing section into an upper tier or cooking chamber $30_a$ and a lower "tier" or cooking chamber $30_b$. In a manner subsequently described, the upper cooking chamber $30_a$ is operated by the fan $58_a$, and the lower cooking chamber $30_b$ is operated by the fan $56_a$. The upper and lower cooking chambers $30_a$, $30_b$ may be operated simultaneously or independently as desired and are provided with separate swing-down access and observation doors $34_a$, $34_b$ mounted on the front housing wall $18_a$. The upper and lower cooking chambers $30_a$ and $30_b$ are respectively provided with upper supply plenum boxes 138 and 140 which are secured to the upper housing wall $16_a$ as illustrated. These upper plenum boxes are similar in configuration to the upper plenum boxes previously described, except that they extend across the entire width and depth of the cooking chambers $30_a$ and $30_b$. The inlet $98_a$ of plenum box 138 extends along its right side, while the inlet $98_b$ of plenum box 140 extends along its left side as viewed in FIGS. 6 and 8.

The support walls $66_a$ and $66_b$ respectively support lower plenum boxes 142 and 144 within the cooking chambers $30_a$ and $30_b$. The inlet openings $86_a$ of plenum box 142 is positioned along its right side, while the inlet $86_b$ of the plenum box 144 is positioned along its left side. The plenum boxes 142 and 144 extend along the entire width and front-to-rear depth of the cooking chambers $30_a$ and $30_b$. Thin metal perforated cooking decks $70_a$ and $70_b$ are supported above the plenum boxes 142 and 144 in the cooking chambers $30_a$ and $30_b$ by suitable support members 146.

As illustrated in FIGS. 6 and 7, during operation of the lower cooking chamber $30_b$, the fan $56_a$ is energized to flow heated return air 148 through supply duct $114_a$ upwardly through a vertical supply passage 150 into the inlets $98_b$ and $86_b$ of the plenum boxes 140 and 144 to create the hot air impingement jets $118_b$ and $126_b$ which are diffused and transversely strike the opposite upper and lower side surfaces of the perforated deck $70_b$ as previously described in conjunction with the slot oven 10. After such impingement, the resulting air flow $130_b$ is drawn rearwardly into an elongated rectangular return slot $132_b$ formed in the rear housing wall $20_a$, and is flowed downwardly into the heating chamber $50_a$ through a vertical return passage 152 (FIG. 7) and the wall opening $136_a$.

Figure 9:
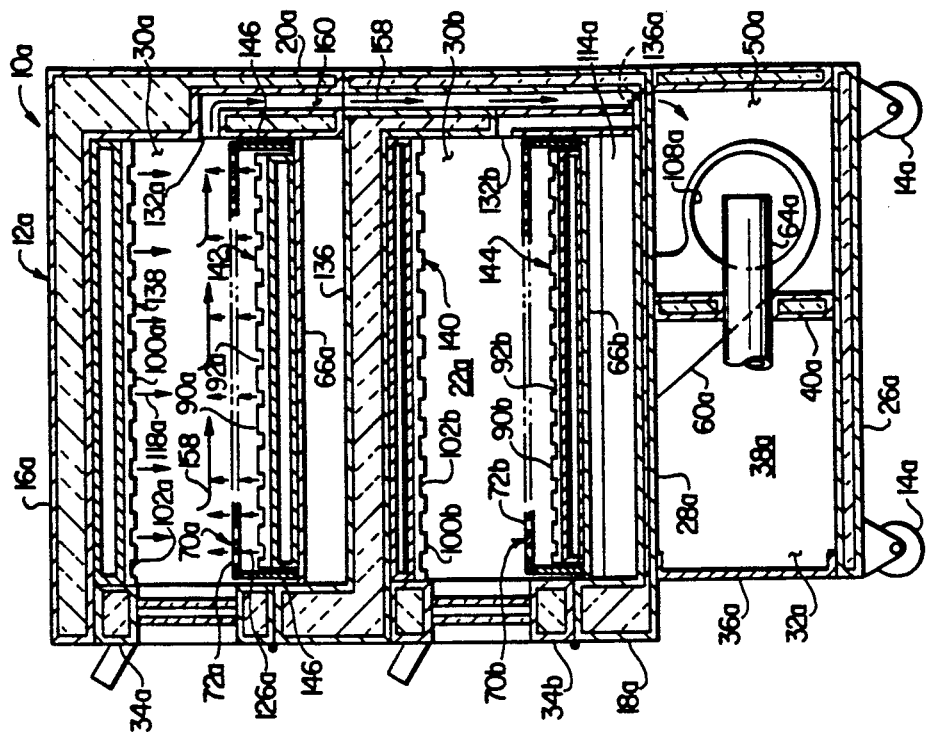
FIGS. 8 and 9 are cross-sectional views similar to those in FIGS. 6 and 7, but with the oven's upper tier being operated.
Figure 8:
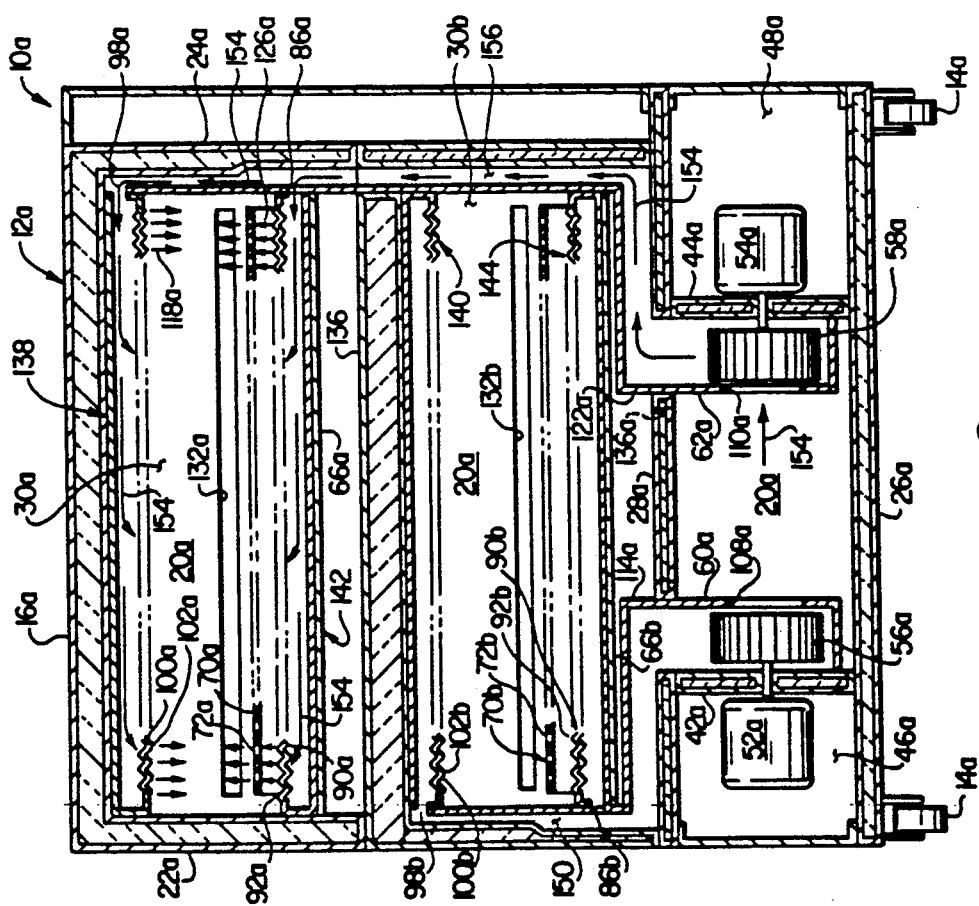

Referring now to FIGS. 8 and 9, during operation of the upper heating chamber $30_a$, the fan $58_a$ is energized to draw heated air 154 into the fan discharge plenum $62_a$ and force the air 154 upwardly through a vertical supply passage 156 into the inlets $98_a$ and $86_a$ of the upper cooking chamber plenum boxes 138 and 142. The heated supply air received in the interiors of the plenum boxes 138 and 142 is forced outwardly through their air discharge slots $102_a$ and $92_a$ to form the heated air impingement jets $118_a$ and $126_a$ which impinge upon the opposite sides of the upper perforated deck $70_a$. The resulting turn air flow 158 is drawn rearwardly into an elongated return air slot $132_a$ formed in the rear housing wall $20_a$ and flowed downwardly through a vertical return passage 160 and into the heating plenum $50_a$ through the opening $136_a$ in the wall $28_a$.

In this manner, either or both of the cooking chambers $30_a$ and $30_b$ may be operated as desired. Control of the fans $52_a$ and $54_a$ and the heating temperature of the recirculated air flowed into and out of the cooking chambers $30_a$ and $30_b$ may be conveniently controlled via a control panel mounted on the front wall of the housing $12_a$ and similar to the control panel 162 (FIG. 1) used in conjunction with the slot oven 10.

Side-by-Side Multiple Tier Pizza Oven

Figure 10:
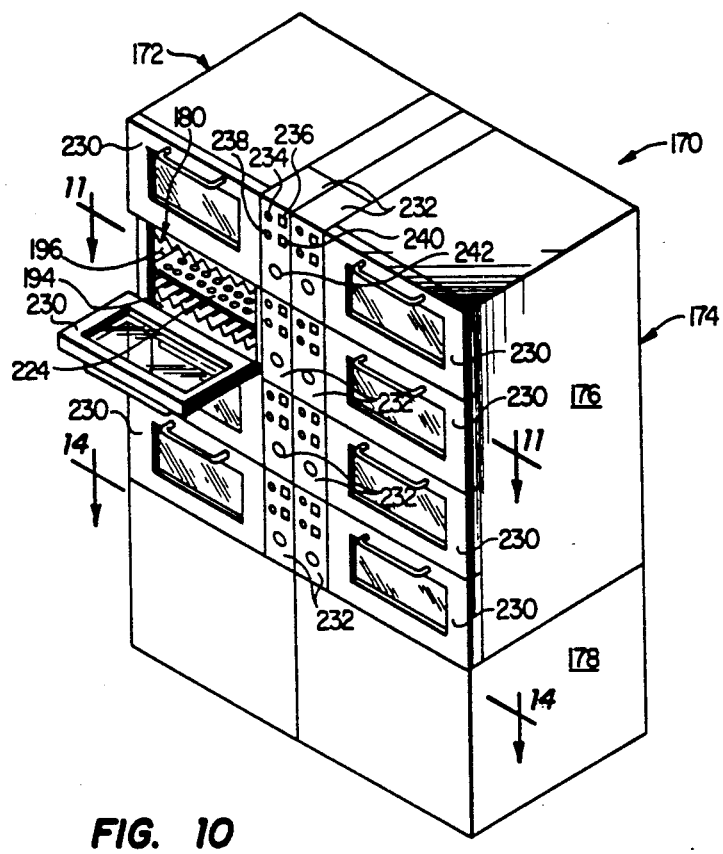
FIG. 10 is a perspective view of a side-by-side multiple tier pizza oven embodiment of the present invention.
Figure 11:
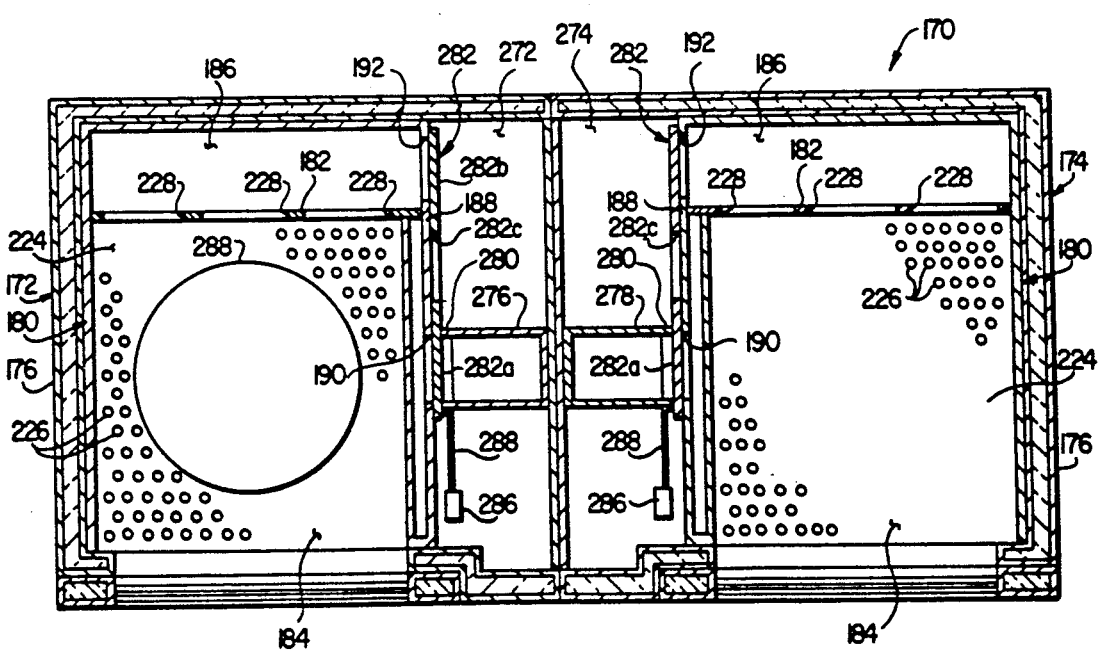
FIG. 11 is a cross-sectional view through the pizza oven taken along line 11—11 of FIG. 10.
Figure 12:
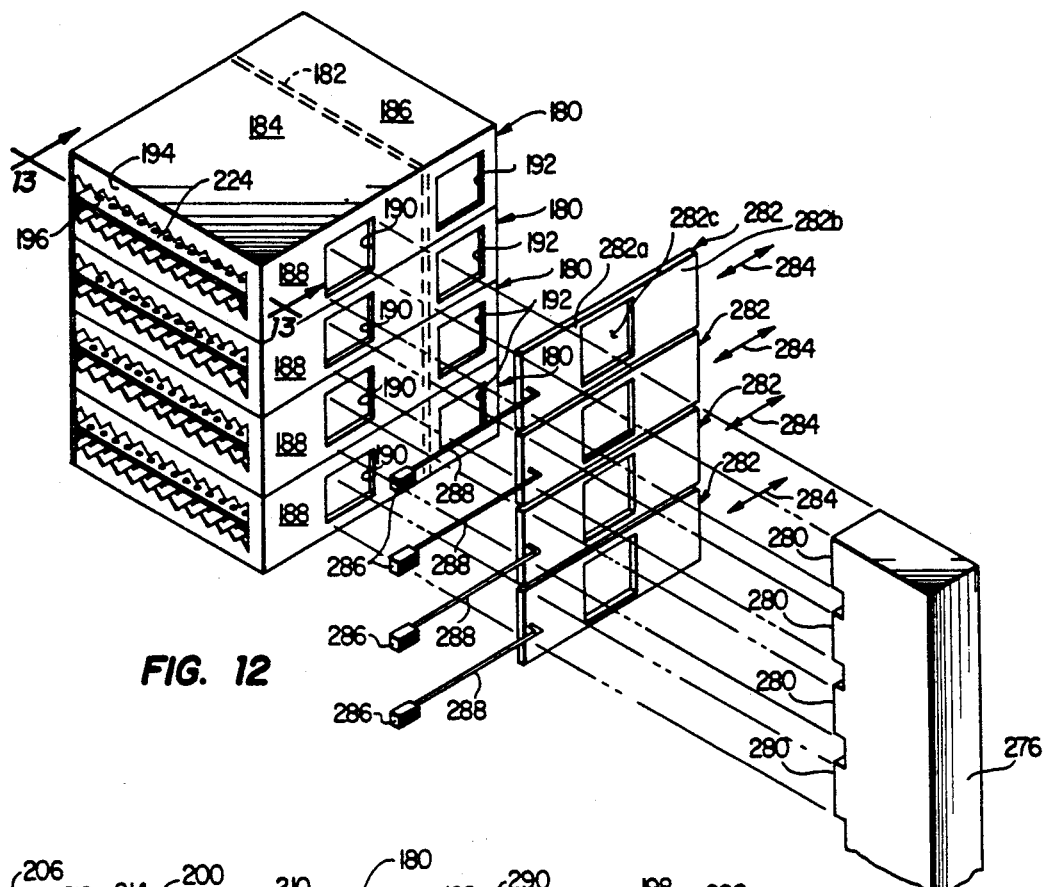
FIG. 12 is a somewhat schematic exploded perspective view of the internal heated air supply portion of the left side of the pizza oven as viewed in FIG. 10.

The side-by-side multiple tier pizza oven 170 illustrated in FIGS. 10–14 includes a pair of insulated metal housings 172 and 174 positioned in side-by-side relationship, each of the housings having an upper section 176 and a lower section 178. Disposed within each of the upper housing sections 176 are four or more vertically stacked plenum box structures 180 (FIG. 12) which are divided by partition walls 182 into a front supply sections 184 and rear return sections 186. As best illustrated in FIGS. 11 and 12, the stacked sets of plenum box structures 180 are laterally spaced apart, and are provided with facing side walls 188 in which rectangular supply inlet openings 190 and rectangular return outlet openings 192 are formed. In each of the plenum box structures 180, the supply opening 190 communicates with the interior of the supply section 184, and the return outlet opening 192 communicates with the interior of the return section 186.

Figure 13:
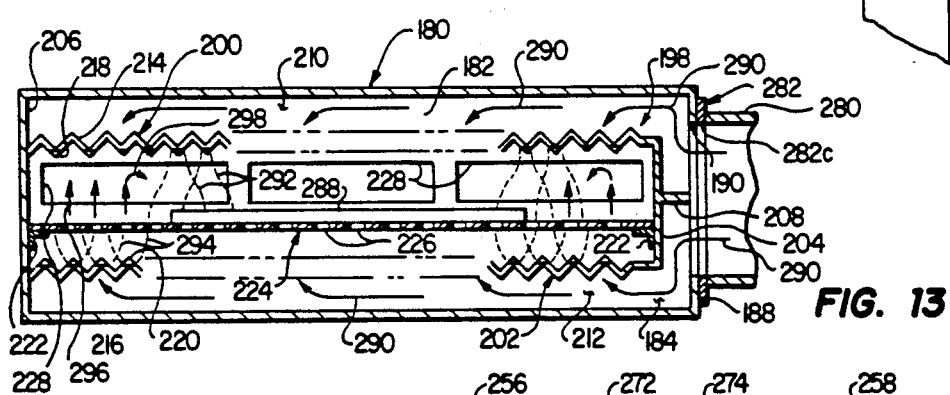
FIG. 13 is an enlarged scale partial cross-sectional view through the upper tier air supply and return plenum structure depicted in FIG. 12, and is taken along line 13—13 of FIG. 12.

Referring now to FIGS. 12 and 13, each of the plenum box structures 180 has a front wall 194 with a horizontally elongated opening 196 formed therein and leading into the interior of the front supply section 184 so that a pizza may be inserted therein and supported and cooked in a manner subsequently described. The interior of the front supply section 184 is provided with an internal wall structure 198 (FIG. 13) which defines the front side opening 196 and comprises a corrugated upper wall 200, a corrugated lower wall 202, and a right side wall 204 which interconnects the right side edges of the walls 200, 202 as illustrated in FIG. 13. The left side edges of the walls 2008 202 are secured to the left side wall 206 of the plenum box structure 180, and the rear side edges of the walls 200, 202 and 204 are secured to the partition wall 182. A baffle plate member 208 projects horizontally from a vertically intermediate portion of the wall 204 to define with the walls 200, 202 and 204 an upper supply plenum 210 and a lower supply plenum 212 within the plenum box structure 180.

The vertically spaced upper and lower corrugated walls 200 and 202 are respectively provided with downwardly projecting, generally V-shaped ridges 214, and upwardly projecting, generally V-shaped ridges 216. Along their front-to-rear lengths, the downwardly facing ridges 214 have formed therein spaced series of elongated rectangular air discharge slots 218. In a similar manner, the upwardly projecting ridges 216 have formed along their front-to-rear lengths series of elongated rectangular air discharge slots 220.

Supported between the ridges 214 and 216 by mounting support brackets 222 is an 18"×18" thin metal plate or cooking deck 224 in which a spaced series of circular openings 226 is formed. In the illustrated embodiment of the deck 224, its thickness is approximately 1/16", and the openings 226 are ¼" circular holes positioned on staggered ½" centers. As illustrated, the deck 224 is considerably closer to the lower corrugated wall 202 than to the corrugated upper wall 200. Positioned vertically between the upper wall 200 and the perforated deck 224 are three elongated rectangular return openings 228 which are formed in the partition wall 182 and intercommunicate the interior of the rear return section 186 with the interior of the wall structure 198 between the upper wall 200 and the perforated deck 224.

As best illustrated in FIG. 10, each of the upper housing sections 176 is provided along its front side with four swing-down doors 230 which may be opened to provide access to the food insertion and withdrawal opening 196 of its associated plenum box structure 180, and may be closed to cover such opening 196. For purposes later described, each of the plenum box structures is provided with its own control panel section 232, the control panels 232 being positioned along the front wall of the oven 170 between the vertical rows of doors 230. Each of the control panel sections 232 is representatively provided with a "cook" button 234, a corresponding cooking indicating light 236, a "warm" button 238 and a corresponding indicating light 240, and a timer set dial 242.

Figure 14:
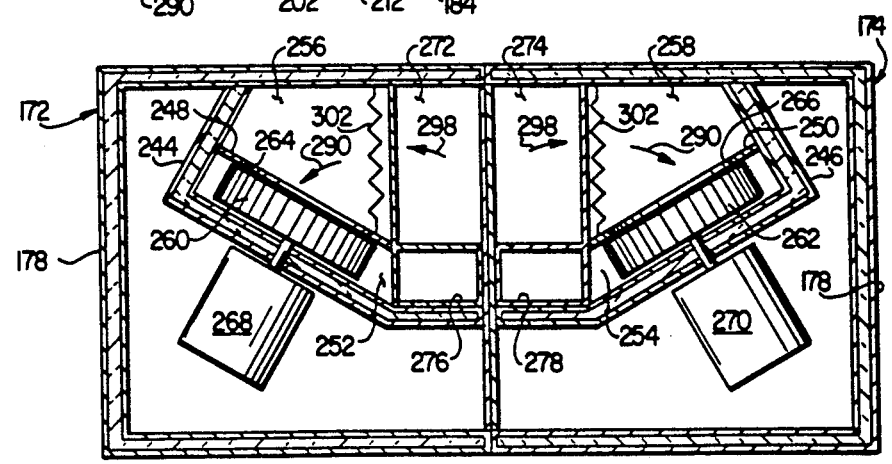
FIG. 14 is an enlarged scale cross-sectional view through the pizza oven taken along line 14—14 of FIG.10.

Referring now to FIG. 14, the lower sections 178 of the side-by-side housings are provided with walled off air handling sections 244 and 246 which are divided by partition walls 248 and 250 into fan plenums 252, 254 and return plenums 256, 258. Centrifugal fan impellers 260 and 262 positioned in the fan plenums 252, 254 communicate with the return plenums 256, 258 through return openings 264, 266 and are driven by motors 268, 270. Communicating at their lower ends with, and extending upwardly from the return plenums 256, 258 are a pair of vertically extending return passages 272 and 274 which are positioned between the rear return sections 186 of the stacked series of plenum box structures 180 as illustrated in FIG. 11. In a similar manner, the lower ends of a pair of vertically extending supply ducts 276, 278 communicate with the fan plenums 252, 254 and extend upwardly between the stacked series of plenum box structure 180 in alignment with the supply inlet openings 190 therein.

As representatively illustrated in FIG. 12, each of the supply ducts 276, 278 is provided with four branch outlet sections 280, each aligned with one of the inlet openings 190. Interposed between each of the branch outlet sections 280 and its associated supply box inlet opening 190 is a slide plate damper member 282 which may be selectively moved in a front-to-rear direction, as indicated by the arrows 284, by means of small actuating motors 286 linked to the damper members 282 by actuating rods 288. Each of the damper members 282 has solid front and rear portions $282_a$, $282_b$, between which a rectangular opening $282_c$ is formed.

When a particular damper member 282 is in its rearwardly moved closed position, its solid portions $282_a$, $282_b$ cover and block the inlet and outlet openings 190, 192 of its associated plenum box structure 180. When the damper member is moved forwardly to an open position, the damper opening $282_c$ is aligned with the plenum box opening 190 and the plenum box opening 192 is uncovered.

During operation of the pizza oven 170, with the fans 260, 262 being operated, one of the doors 230 is swung downwardly to its open position as depicted in FIG. 10, thereby uncovering the front opening 196 of one of the plenum box structures 180. A pizza 288 to be cooked is positioned atop the perforated deck 224 in the opened plenum box structure. The opened door 230 is then closed and the cook button 234 associated with the particular plenum box structure is pushed. This causes the plenum box structure's damper member 282 to automatically be moved forwardly to its open position so that heated air 290 is flowed inwardly from the duct supply branch 280 into the inlet opening 190 through the upper and lower portions thereof formed by the baffle plate member 208. The heated air 290 is thus forced into the upper and lower supply plenums 210 and 212 where it is discharged downwardly and upwardly through the discharge slots 218, 220 in the form of relatively high velocity heated air impingement jets 292 and 294 (FIG. 13).

The jets 292 and 294 laterally diffuse after their discharge from the slots 218, 220 and transversely impinge upon the upper side surface of the deck 224 and the pizza 288, and the lower side surface of the deck 224. This laterally diffusion, or "pluming", of the jets 292 and 294 causes them to at least slightly overlap and therefore evenly blanket the deck and pizza surfaces upon which they transversely impinge. A portion of the lower jets 294 pass upwardly through the deck openings 226 directly onto the lower surface of the pizza, while the remaining lower jets 294 are passed upwardly through the remaining deck openings 226 to create the upward air flow indicated by the arrows 296. The air flow 296 mixes with the air flow from the jets 292 after they have impinged upon the upper deck and pizza surfaces to form a return air flow 298 which is drawn rearwardly through the return openings 228 into the return portion 186 of the plenum box structure 180 in which the pizza 288 is being cooked (see FIG. 11). The return air flow 298 is drawn outwardly through the return outlet 192 and is drawn into the return duct 272 through a suitable opening 300 therein. As illustrated in FIG. 14, the return air flow 298 drawn downwardly through the return duct 272 exits its open bottom end and is drawn across one of a pair of electric heating coils 302 to form the heated air 290 which is drawn into the fan 260 and supplied via the supply duct 276 to the particular plenum box structure 180. In this manner, a continuous flow of recirculated heated air is delivered into and from the selected plenum box structure 180.

When the cooking time for the pizza 288 in its selected plenum box structure 180 is completed, as determined by the setting of the particular timer dial 242, the appropriate damper member 282 is automatically moved rearwardly to its closed position, thereby terminating the heated air inflow through the inlet opening 190, and the heated air outflow through the return outlet 192 of the plenum box structure. This automatically energizes the plenum box's warming light 240 to indicate that the pizza 288 is fully cooked. A slight amount of air leakage through the plenum box's inlet and outlet openings maintains the cooked pizza in a "warming mode" until it is removed from its perforated deck 224.

A considerable degree of flexibility is built into the illustrated multiple tier pizza oven 170. For example, its side-by-side halves may be independently or simultaneously operated depending on whether one or both of the fans 260, 262 is operated. During operation of either of the fans 260, 262, its associated supply duct 276 is continuously pressurized at an essentially constant pressure awaiting the opening of one or more of its associated damper members 282. Accordingly, in either half of the oven 170, from one to several pizzas may be in various stages of their overall cooking cycles, each of such cycles being automatically controlled and terminated so that the particular pizza or pizzas are conveniently kept warm until they are removed for delivery to the customer.

The previously described diffused air impingement pattern directed at a relatively high velocity onto opposite sides of selected ones of the perforated decks 224 provide for extremely rapid yet very uniform cooking of the pizza or pizzas, while at the same time maintaining a very high quality of the resulting food product. This is true regardless of where on its perforated deck 224 the particular pizza is placed, and there is no necessity whatever to move the pizza about in its cooking chamber to assure this even cooking of the pizza. The transverse impingement of the heated air onto the perforated deck provides an accelerated rate of air-to-deck heat transfer which provides for extremely rapid warmup times without the relatively long delays encountered with, for example, conventional stone pizza cooking hearths.

Countertop Oven

Figure 15:
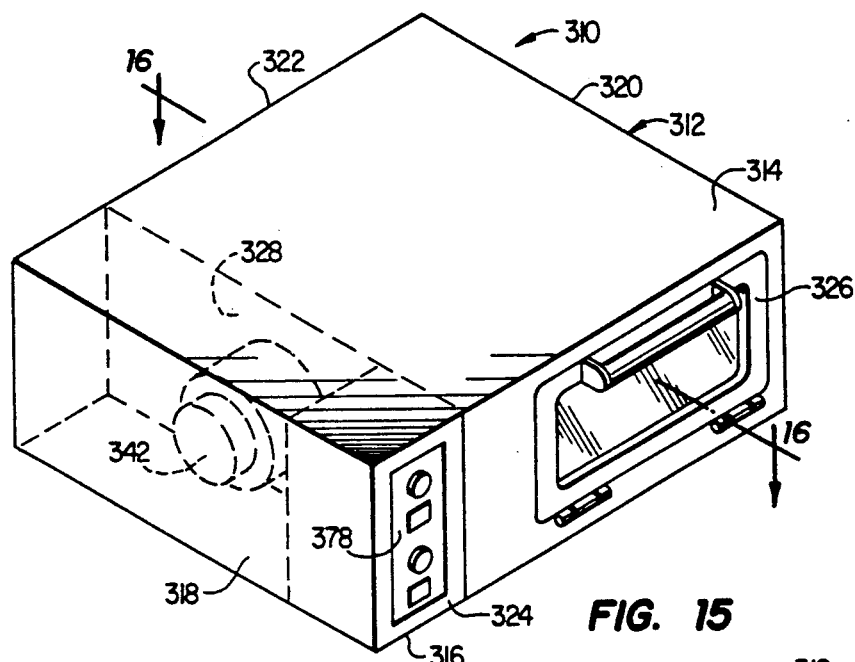
FIG. 15 is a perspective view, partially in phantom, of a countertop oven embodiment of the present invention.
Figure 16:
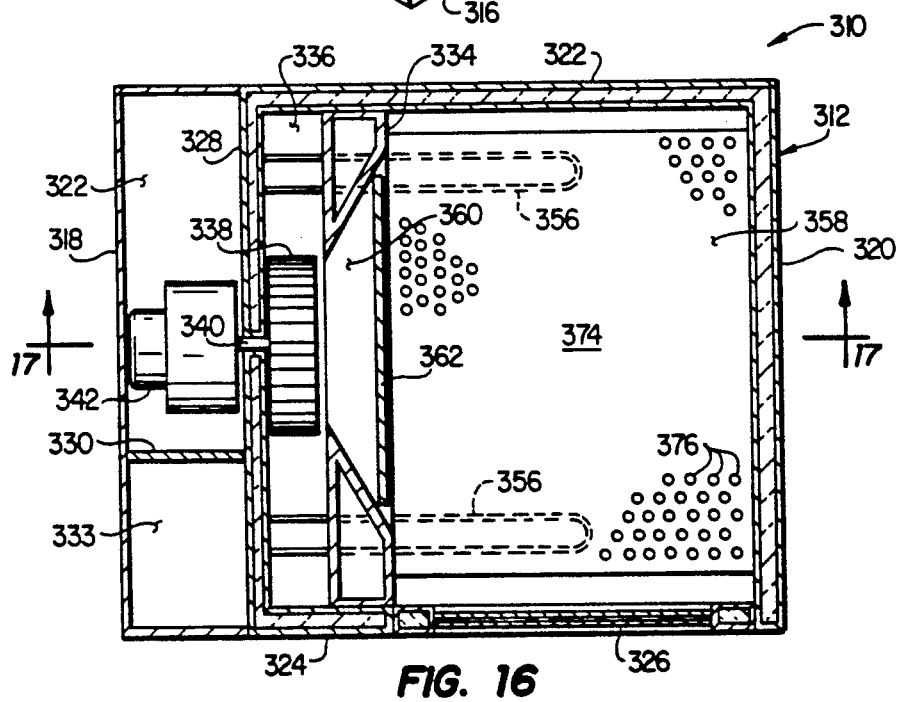
FIG. 16 is a cross-sectional view through the countertop oven taken along line 16—16 of FIG. 15.
Figure 17:
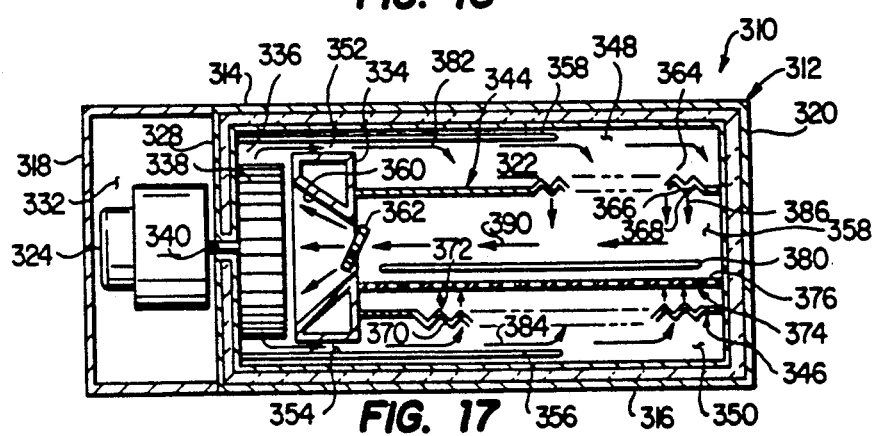
FIG. 17 is a cross-sectional view through the countertop oven taken along line 17—17 of FIG 16.

The countertop oven 310 depicted in FIGS. 15–17 comprises an insulated metal housing 312 which is conveniently sized to rest on a kitchen countertop and has top and bottom walls 314 and 316, left and right side walls 318 and 320, a rear wall 322, and a front wall 324 provided with a swing-down closure and observation door 326. Within a left side portion of the housing 312, partition walls 328 and 330 form a motor chamber 332 and a control chamber 333. Extending between the rear and front walls 322, 324, and spaced rightwardly of the partition wall 328 is a baffle structure 334 which defines with the partition wall 328 a fan chamber 336. A centrifugal fan impeller 338 is operatively positioned in the fan chamber 336 and is rotationally driven by a drive shaft 340 connected to a fan motor 342 disposed within the motor chamber 332.

A pair of vertically spaced, horizontally positioned upper and lower plate members 334 and 346 extend between the baffle structure 334 and the right housing wall 320, and between the rear and front housing walls 322 and 324. The plates 344, 346 define with the top and bottom housing walls 314, 316 an upper supply plenum 348 and a lower supply plenum 350. Supply plenums 348, 350 respectively communicate with the fan chamber 336 via passages 352 and 354 disposed above and beneath the baffle structure 334. A pair of electric heating elements 356 extend from the partition wall 328 into the lower supply plenum 350 through the passage 354, and a pair of heating elements 358 extend from the partition wall into the upper supply plenum 348 through the passage 352.

The upper and lower plates 344, 346 define therebetween a cooking chamber 358 that communicates with the inlet of the fan impeller 338 through a tapered opening 360 formed through the baffle structure 334. The opening 360 has positioned therein a suitable flow control damper 362.

A right side portion of the upper plate 344 is corrugated as at 364 to form downwardly projecting, generally V-shaped ridges 366 that extend between the rear and front housing walls 322, 324. Each of these downwardly projecting ridges 366 is provided with a spaced series of elongated rectangular air discharge slots 368. In a similar fashion, most of the left-to-right length of the lower plate 346 is corrugated to form a series of upwardly projecting, generally V-shaped ridges 370, each of such ridges being provided along its front-to-rear length with a spaced series of elongated rectangular air discharge slots 372.

Supported above the lower plate member 346, just below the baffle structure return opening 360, is a thin metal cooking plate or deck 374 having formed therethrough a series of circular openings 376. The illustrated deck 374 is approximately 1/16" thick, and is of an elongated rectangular configuration, having a 13" left-to-right width and an 18" front-to-rear length. These dimensions are each one half of the stand commercial oven cooking area size. The holes 376 have ¼" diameters, and are spaced apart on staggered ¼" centers. As can be best seen in FIG. 17, the deck 374 is considerably closer to the lower plate 346 than it is to the upper plate 344.

The countertop oven 310 is controlled via a suitable control panel 378 (FIG. 15) mounted on the front wall 324 over the control chamber 333, and is operated as follows. A desired food product contained, for example, in a cooking pan 380 is placed atop the perforated deck 374, the door 326 is closed, and the oven is energized to operate the fan 338 and the heating elements 356 and 358. Air within the fan chamber 336 is forced by the fan 338 through the passages 352, 354 across the heating elements 358 and 356 into the upper and lower supply plenums 348 and 350 in the form of heated air 382 and 384.

The heated air 382 and 384 is forced downwardly and upwardly through the air discharge slots 368 and 372 in the form of relatively high velocity heated air impingement jets 386 and 388. The upper jets 386 laterally diffuse, or "plume", prior to their transverse impingement upon a right side portion of the food product within the pan 380 and a right side portion of the upper surface of the perforated deck 374, thereby evenly "blanketing" these right side surface portions with transversely directed heated impingement air.

The lower jets 388 also laterally diffuse or "plume" prior to striking the underside of the perforated deck 374. In this manner, the lower jets 388 overlap at least to a small degree, thereby evenly blanketing the underside of the deck 374 with transversely directed heated impingement air. Some of the lower jets 388 pass upwardly through the deck openings 376 and impinge upon the bottom side of the pan 380. The remainder of the lower jets 388, and the air downwardly deflected from the deck area below the pan, are flowed upwardly through the rest of the deck openings 376 and mix with the upper jets 386 after their impingement upon the pan and deck, to form a return air flow 390 which is drawn horizontally across the pan 380 into the inlet of the fan 338 through the baffle structure opening 360. This returning air flow is then forced outwardly from the fan into the upper and lower supply plenums 348, 350 to maintain a recirculated flow of heating air through the oven housing. The flow rate of such recirculating heating air may be easily regulated by appropriate adjustment of the damper 362. Similarly, the temperature of such recirculated air may be regulated by suitable control of the upper and lower heating elements 358 and 356.

The laterally diffused, transversely directed flow of the upper and lower jets 386, 388 onto opposite side surfaces of the deck 374, and onto the upper surface of the food product and the lower surface of the pan 380, coupled with the very even lateral distribution of the impingement air flow on such surfaces functions to very rapidly cook the food product in a fraction of the time required in conventional air flow ovens. The rapid cooking of the food product is achieved, however, without the necessity of moving the food product during the cooking cycle or diminishing the quality of the finally cooked food product.

Half-Size Air Impingement Convection Oven

Figure 20:
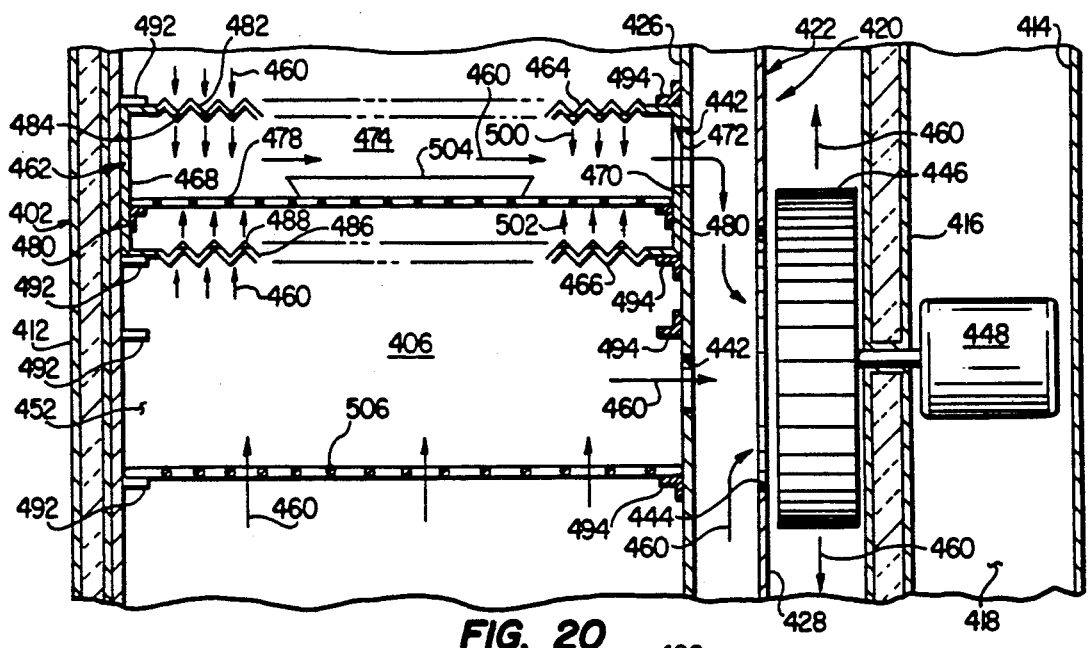
FIG. 20 is a partial cross-sectional view through the convection oven taken along line 20—20 of FIG. 21.
Figure 21:
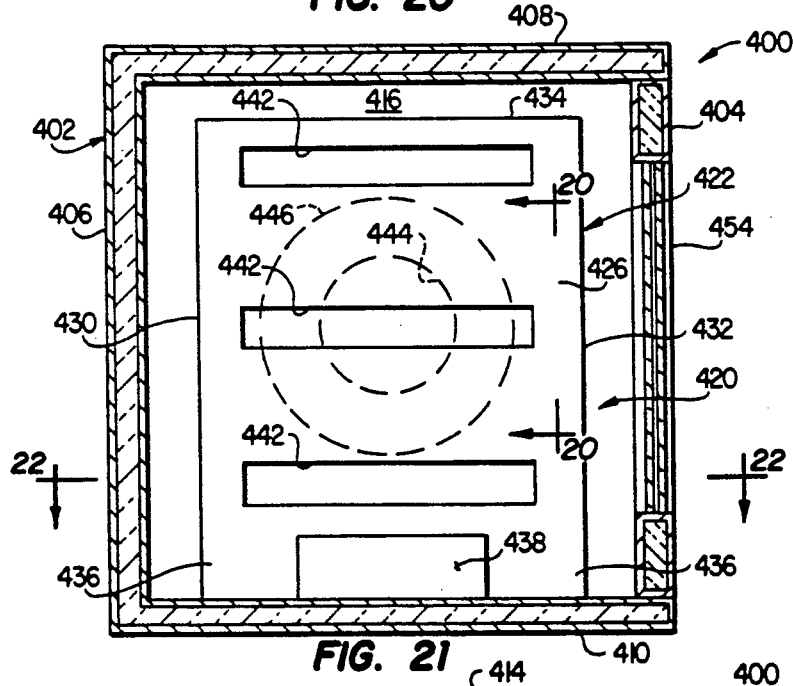
FIG. 21 is an enlarged scale cross-sectional view through the convection oven taken along line 21—21 of FIG. 18, the oven's supply plenum structures and their support brackets having been removed for illustrative purposes.
Figure 22:
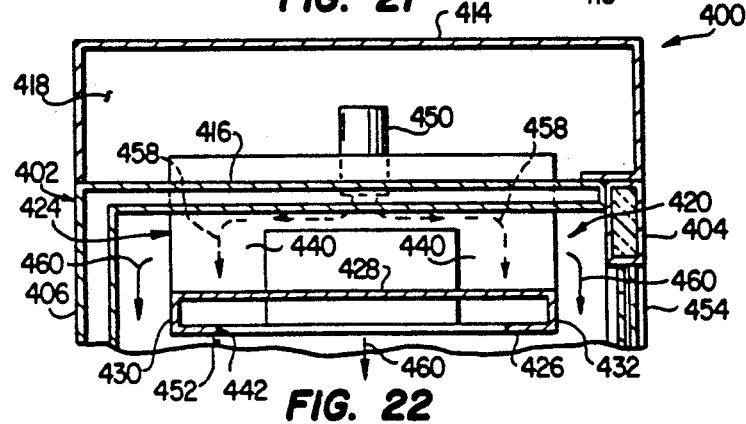
FIG. 22 is a partial cross-sectional view through the convection oven taken along line 22—22 of FIG. 21.

The half-size air impingement convection oven 400 illustrated in FIGS. 18–22 has an insulated metal housing 402 having a front wall 404, a rear wall 406, and top wall 408, a bottom wall 410, a left side wall 412, and a right side wall 414. As best illustrated in FIGS. 20 and 22, an insulated vertical partition wall 416 is spaced inwardly from the right side wall 414 and forms therewith a motor and burner chamber 418 within a right side portion of the housing 402. A generally L-shaped hollow metal baffle structure 420 is positioned within the housing and has a vertically extending, elongated rectangular front portion 422 spaced leftwardly from the partition wall 416, and a hollow rectangular base portion 424 which extends rightwardly from the bottom of the portion 422 through the partition wall 416 into the chamber 418.

The front baffle portion 422 has a front side wall 426, a rear side wall 428, a pair of opposite side edge walls 430 and 432, which are spaced inwardly from the housing walls 406 and 404, and a top edge wall 434 which is spaced downwardly from the top housing wall 408. At the bottom of the front baffle structure portion 422 are a pair of leg portions 436 (FIG. 21) which define therebetween a rectangular opening 438. Legs 436 are joined to corresponding leg portions 440 (FIG. 22) of the baffle structure base portion 424. Three horizontally elongated rectangular inlet openings 442 are formed in the front side wall 426, and a circular outlet opening 444 is formed in the rear wall 428.

A centrifugal fan impeller 446 (FIGS. 20 and 21) is positioned between the partition wall 416 and the front portion 422 of the baffle structure 420, and is driven by a motor 448 positioned in the chamber 418. Also positioned in the chamber 418 is a fuel burner 450 (FIG. 22) which is extended into the base portion 424 of the baffle structure 420. Positioned between the baffle structure front portion 422 and the left housing wall 412 is a cooking chamber 452 to which access is provided by a closure and observation door 454 (FIG. 18) mounted on the front housing wall 454 immediately to the left of a control panel section 456 thereon.

During operation of the convection oven 400, the burner 450 forces products of combustion 458 through the base portion legs 440 and upwardly through the front portion legs 436 into the interior of the baffle structure front portion 422. The hot products of combustion are mixed with air 460 drawn by the fan 446 from the cooking chamber 452 into the interior of the baffle structure front portion 422 through its rectangular inlet openings 442. The air 460 heated in this manner is drawn through the baffle structure outlet opening 444 into the inlet of the fan 446. The heated air 460 drawn into the fan 446 is then vertically discharged into the cooking chamber 52 across the top and side edges of the baffle structure front portion 422, and through its bottom opening 438. Before entering the baffle structure inlet openings 442 for mixture with and heating by the products of combustion 458, the air 460 within the cooking chamber 452 is forced into and through three air impingement cooking plenum boxes 462 which will now be described in conjunction with FIGS. 18-20.

Each of the cooking plenum boxes 462 is of an elongated rectangular metal construction and has top and bottom side walls 464 and 466 a left end wall 468, a right end wall 470 having a horizontally elongated rectangular outlet opening 472 formed therein and of the same size as the baffle structure wall openings 442, a closed rear side wall 474, and an open front side 476. A 13"×18" food support rack 478 is removably supported within each cooking plenum box 462 on suitable support brackets 480. The rack 478 is positioned just below the outlet opening 472 and is considerably closer to the bottom corrugated wall 466 than to the top corrugated wall 464.

The corrugations in the top wall 464 are provided with a series of downwardly projecting, generally V-shaped ridges 482, each of such ridges having formed therein along its length a spaced series of elongated rectangular air discharge slots 484. In a similar manner, the bottom corrugated wall 466 is provided with a series of upwardly projecting, generally V-shaped ridges 486 in each of which is formed a spaced series of elongated rectangular air discharge slots 488.

Figure 18:
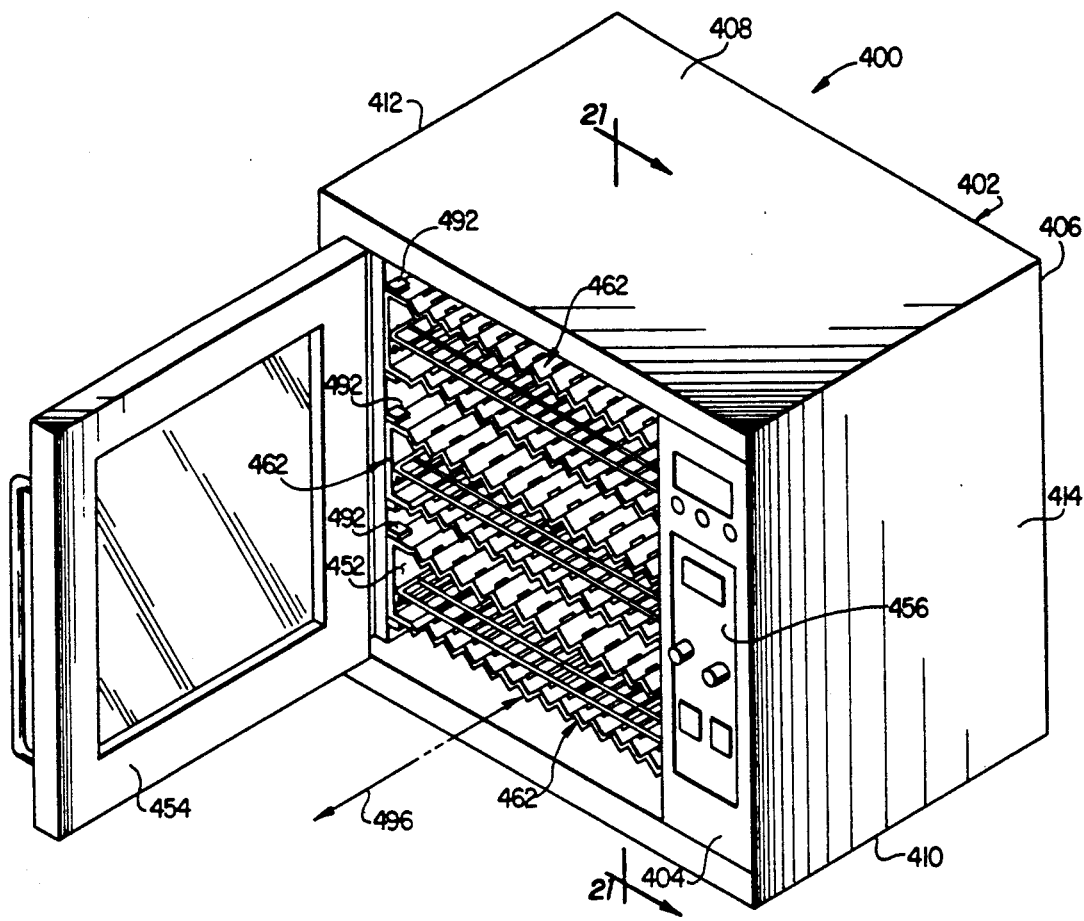
FIG. 18 is a perspective view of a half-size convection oven embodiment of the present invention.
Figure 19:
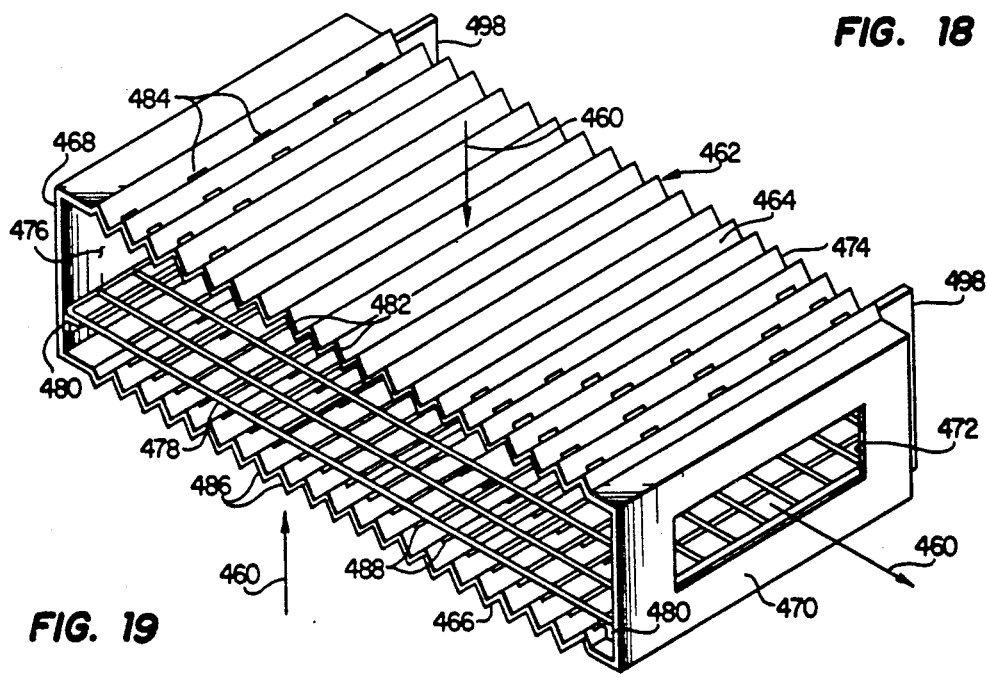
FIG. 19 is an enlarged scale perspective view of one of the removable air impingement supply plenum structures used in the convection oven.

Referring now to FIGS. 18 and 20, three vertically spaced pairs of support brackets 492, 494 are respectively secured to the walls 412, 426 within the cooking chamber 452. Each of the cooking plenum boxes 462 is removably insertable into the cooking chamber 452 as indicated by the double-ended arrow 496 in FIG. 18, and is supported by the brackets 492 and 494 as illustrated in FIG. 20. Each of the cooking plenum boxes 462, when inserted in the cooking chamber 452 in this manner, is spaced somewhat forwardly from the rear housing wall 406 by means of setoff tabs 498 (FIG. 19) secured to the rear wall of the plenum box. With the housing door 454 in its closed position, the door covers the open front side 476 of each of the plenum boxes.

During operation of the oven 400, heated air 460 flowed into the cooking chamber 452 as previously described is forced downwardly and upwardly into the interior of each of the plenum boxes 462 through the discharge slots 484 and 486 and enters the interior of the plenum box in the form of downwardly directed heated air impingement jets 500, and upwardly directed heated air impingement jets 502 as best illustrated in FIG. 20. The upper and lower jets 500, 502 laterally diffuse, or "plume", before striking the upper side surfaces of the food support rack 478 in a manner evenly blanketing its opposite side surfaces with transversely directed heated impingement air. Accordingly, the upper and lower side surfaces of, for example, a cooking pan 504 supported on the rack 478 are similarly subjected to a highly uniform flow of relatively high velocity, heated air impingement flow to very rapidly and evenly cook a food product supported in the pan.

The heated air entering the plenum box 462 illustrated in FIG. 20 is drawn horizontally rightwardly across the rack 478 and the food pan 504 through the plenum box outlet opening 472 which is aligned with one of the baffle structure wall openings 442. The return air exiting the plenum box is then flowed through the baffle structure portion 422 and into the fan 446 as previously described.

While the plenum boxes 462 just described function to very rapidly and evenly cook a variety of food items which may be operatively disposed therein, one or more of the plenum boxes may be removed and temporarily replaced with a conventional cooking rack 506 (FIG. 20) to utilize a portion of the oven 400 as a more conventional convection oven without this impingement air feature.

Figure 23:
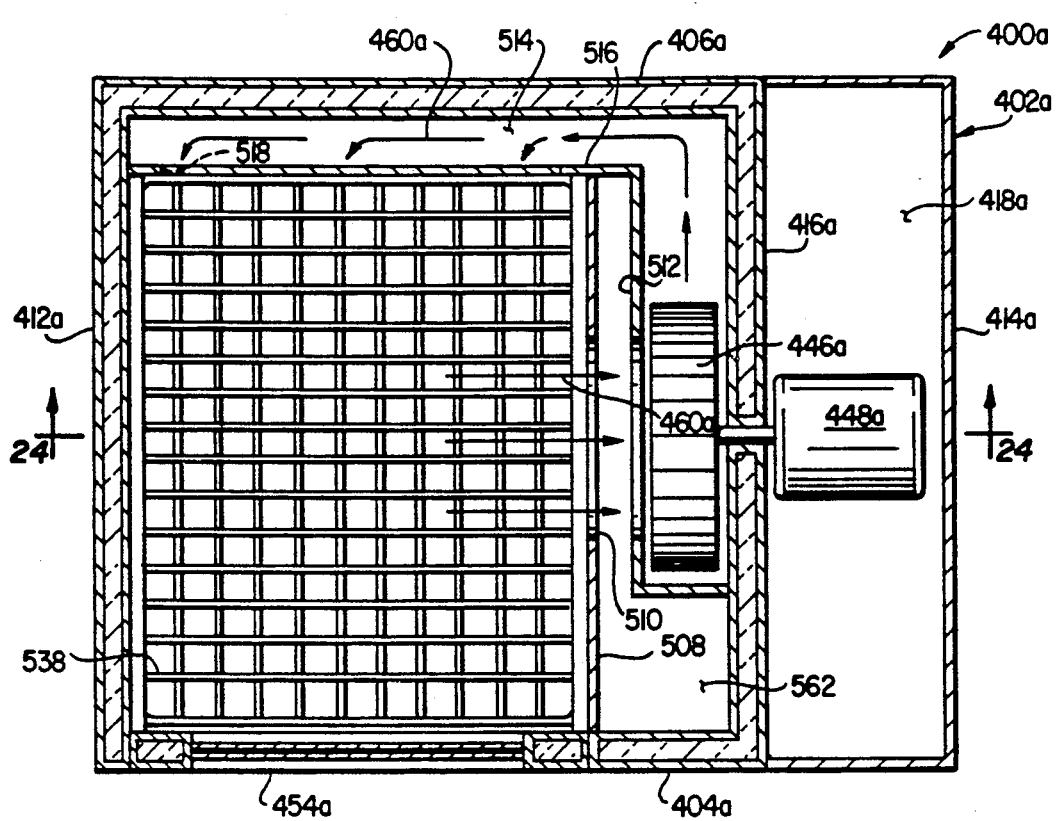
FIG. 23 is a downwardly directed cross-sectional view through an alternate embodiment of the convection oven.
Figure 24:
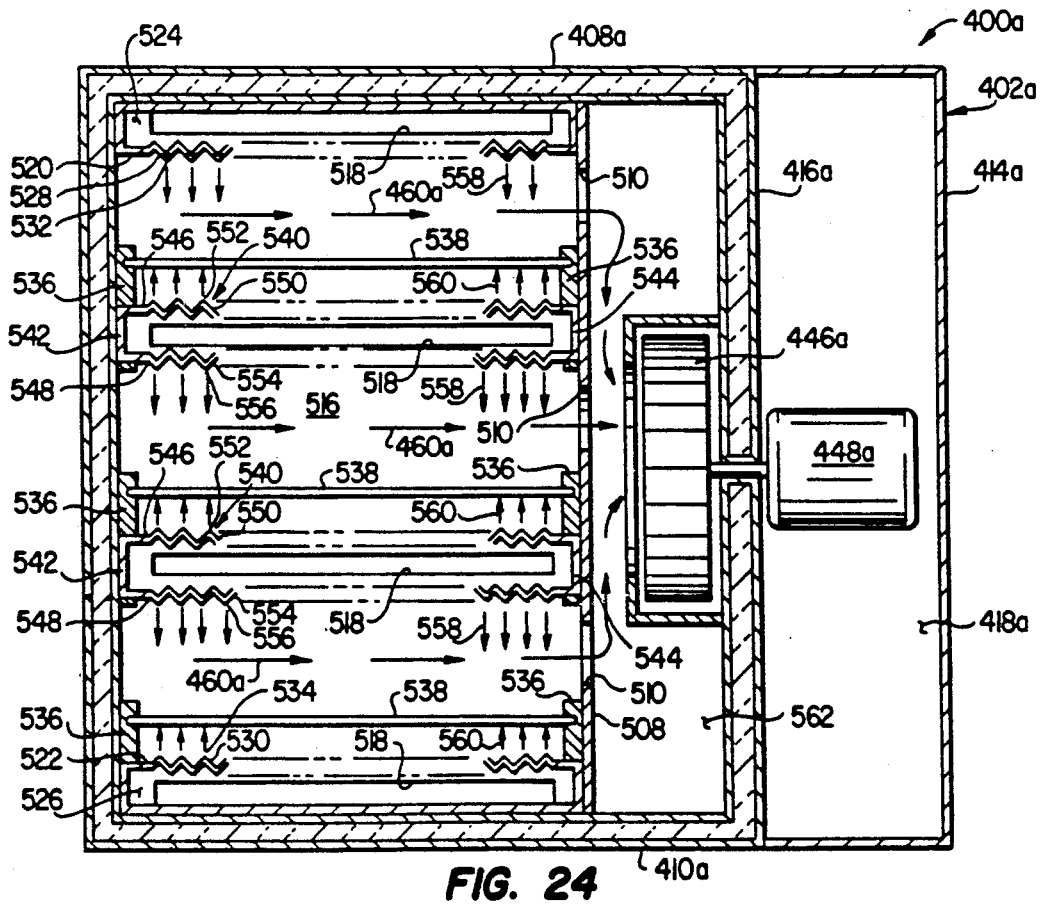
FIG. 24 is a cross-sectional view through the alternate convection oven embodiment taken along line 24—24 of FIG. 23.
Figure 25:
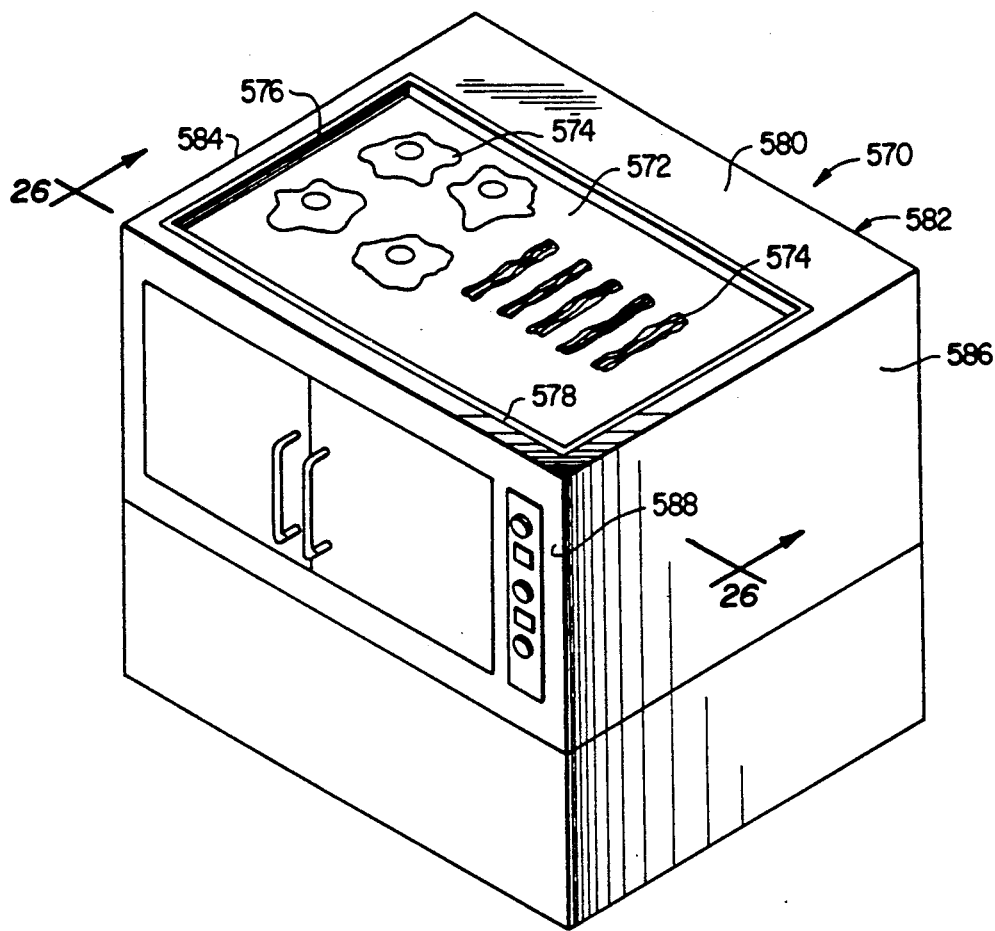
FIG. 25 is a perspective view of an air impingement griddle embodiment of the present invention.

Cross-sectionally and somewhat schematically illustrated in FIGS. 23 and 24 is an alternate embodiment $400_a$ of the previously described air impingement convection oven 400. For purposes of ready comparison, components in the alternate oven embodiment $400_a$ similar to those in the oven 400 have been given the same reference numerals, but with the subscripts "a".

In the oven $400_a$, the baffle structure is eliminated, and the fan $446_a$ is positioned within a return plenum 562 defined between a partition wall 508 and the partition wall $416_a$. Partition wall 508 is provided with three vertically spaced, horizontally elongated rectangular inlet openings 510. The fan $446_a$ is housed within a discharge plenum 512 that communicates with a supply plenum 514 formed with the rear housing wall $406_a$ by a vertical partition wall 516 having four horizontally elongated rectangular outlet openings 518 formed therein. Upper and lower corrugated baffle walls 520 and 522 are formed across the cooking chamber $452_a$ to form supply plenums 524 and 526 that respectively communicate with the upper and lower wall openings 518. The corrugations in the upper and lower baffle walls 520, 522 respectively have downwardly and upwardly projecting, generally V-shaped ridges 528, 530 which are provided with spaced series of elongated rectangular discharge slots 532, 534. Secured to the left housing wall 412$_a$ and the partition wall 508 within the cooking chamber 452$_a$ are three vertically spaced pairs of support channel members 536, each pair of which horizontally supports a cooking rack 538. The lower cooking rack 538 is spaced a short distance above the lower corrugated baffle wall 522.

The upper two support channel member pairs 536 also support, beneath the upper two racks 538, a pair of supply plenum box members 540. Each of the supply plenum boxes 540 has an open rear side positioned against the partition wall 516 over one of its openings 518, a closed front wall, left and right end walls 542 and 544, a corrugated upper side wall 546, and a lower corrugated side wall 548. The corrugations in the upper side walls 546 are provided with upwardly projecting, generally V-shaped ridges 550 having spaced series of elongated rectangular air discharge slots 552 formed therein, while the corrugations in the lower box walls 548 have downwardly projecting, generally V-shaped ridges 554 with spaced series of elongated rectangular air discharge slots 556 formed therein.

During operation of the oven 400$_a$, the heated air 460$_a$ (which is heated by electric resistance heating elements or a suitable fuel burner not illustrated) is forced by the fan 446$_a$ into the rear side supply plenum 514 and is then forced forwardly through the partition wall outlet openings 518 into the supply plenums 524 and 526, and into the interiors of the plenum boxes 540. Such heated air is then forced outwardly through the previously described air discharge slots in the form of downwardly directed heated air impingement jets 558, and upwardly directed heated air impingement jets 560.

As can be seen in FIG. 24, each of the three support racks 538 is positioned between opposing sets of jets 558 and 560, the racks 538 being positioned substantially closer to their associated source of upwardly directed jets than to their associated source of downwardly directed jets. Each set of jets 558, 560 laterally diffuse and overlap prior to transversely striking the opposite upper and lower side surfaces of the racks 538 and food items or food containers supported thereon. In this manner, the racks are very evenly blanketed with transversely directed heated impingement air to provide for very rapid and even cooking of food products within the cooking chamber 452$_a$. After it performs such impingement functions, the heated air flow 460$_a$ is drawn horizontally rightwardly into the partition wall openings 510 into the return plenum 562, within which the fan 446$_a$ is positioned, and is drawn into the fan inlet for recirculated flow into the heating chamber 452$_a$ as previously described.

Air Impingement Cooking Griddle

Figure 26:
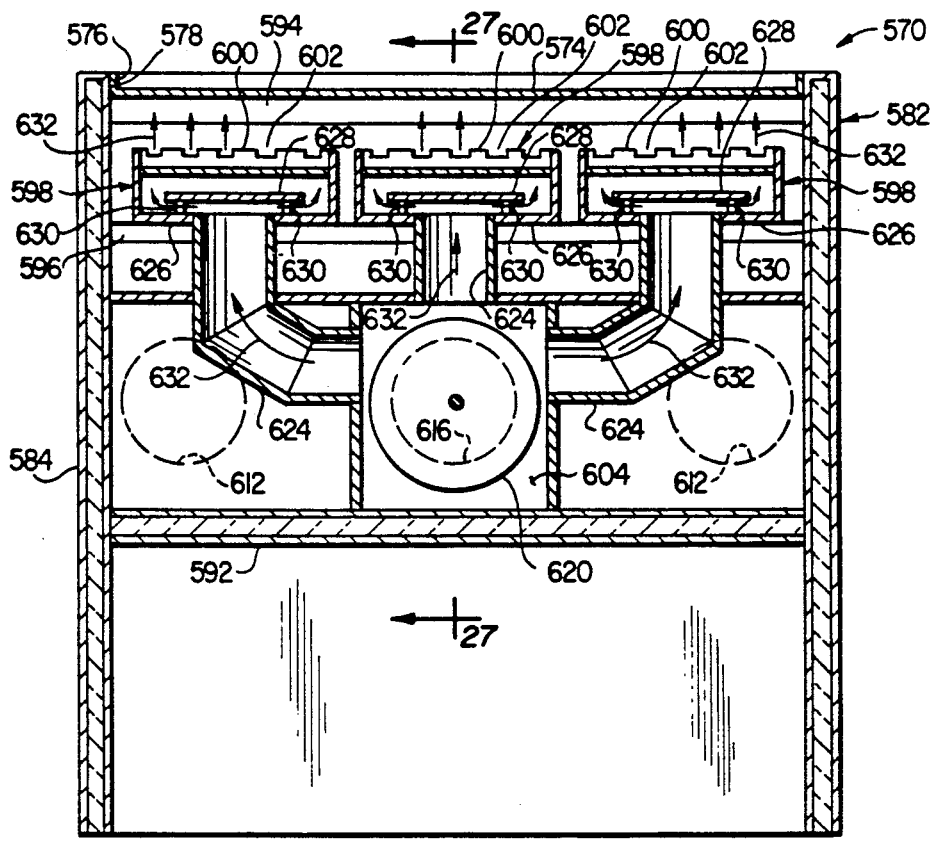
FIG. 26 is an enlarged scale cross-sectional view through the griddle taken along line 26—26 of FIG. 25.
Figure 27:
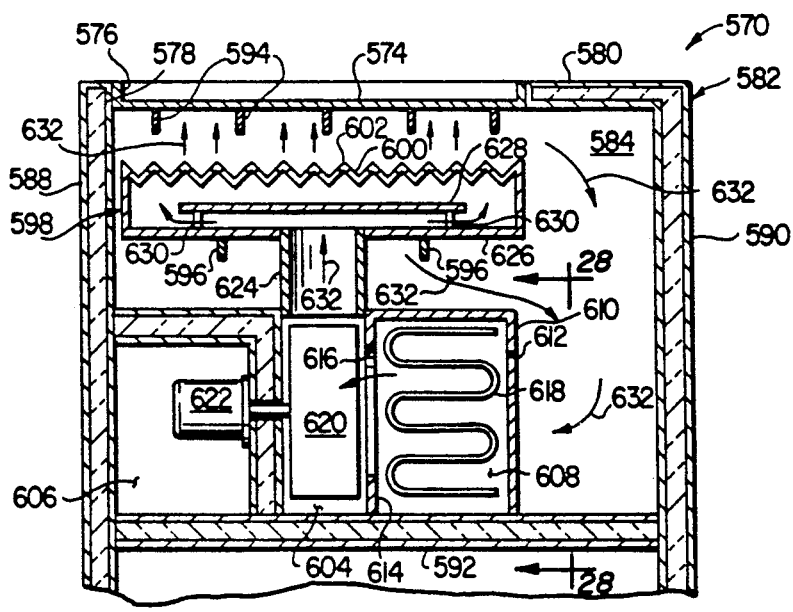
FIG. 27 is a partial cross-sectional view through the griddle taken along line 27—27 of FIG. 26.

The air impingement cooking griddle 570 shown in FIGS. 25-28 utilizes a solid, thin metal griddle plate 572 to fry food items 574 supported thereon. Griddle plate 572 has an elongated rectangular configuration and is provided around its periphery with an upturned metal lip 576. The griddle plate is received in a complementarily configured opening 578 formed in the top wall 580 of an insulated metal housing 582. In addition to the top wall 580, the housing 582 has left and right side walls 584 and 586, a front wall 588, a rear wall 590, and an elevated interior bottom wall 592. The griddle plate 574 is supported within the housing opening 578 by means of a spaced series of horizontally extending, elongated rectangular support plates 594 (FIGS. 26 and 27).

Positioned below the support plates 594, and supported on elongated rectangular plates 596, are three air supply plenum boxes 598. The plenum boxes 598 have elongated rectangular configurations, are positioned in a laterally spaced relationship, and, as best illustrated in FIG. 27, extend lengthwise across the width of the griddle plate 574 above. Each of the plenum boxes 598 is provided with a corrugated upper wall whose corrugations have upwardly projecting, generally V-shaped ridges 600 in which spaced series of elongated rectangular air discharge slots 602 are formed.

Figure 28:
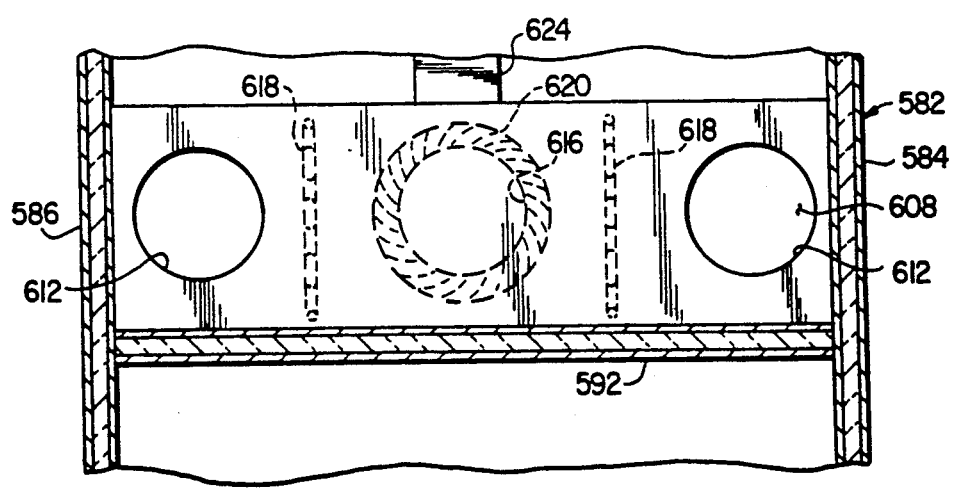
FIG. 28 is a partial cross-sectional view through the griddle taken along line 28—28 of FIG. 27.

A fan plenum 604 is supported on the interior housing wall 592 beneath the plenum boxes 598, and is positioned between a motor chamber 606 at the front of the housing 582 and a heating chamber 608 spaced forwardly of the rear wall 590 of the housing 582. Heating chamber 608 has a rear wall 610 in which a pair of circular return air openings 612 are formed at its opposite ends as best illustrated in FIG. 28. The front wall 614 of the heating chamber 608 has a circular opening 616 formed therein which communicates with the interior of the fan plenum 604. As illustrated in FIG. 28, the heating chamber outlet opening 616 is positioned horizontally between the return air opening 612, and a pair of electric resistance heating coil elements 618 are positioned between the return air openings 612 and the heating chamber outlet opening 616. A centrifugal fan impeller 620 is positioned within the fan plenum 604, and is driven by a motor 622 positioned in the motor chamber 606.

Extending outwardly from the fan plenum 604 are three branch supply ducts 624 which are extended upwardly through the bottom walls 626 of the supply plenum boxes 598. The open upper ends of the branch supply ducts 624 are positioned beneath baffle plates 628 positioned within the plenum boxes and supported in an elevated position relative to the bottom plenum box walls 626 by small support members 630.

During operation of the griddle 570, air 632 behind the heating chamber 608 is drawn inwardly into the heating chamber through its rear wall openings 612, is flowed across the heating elements 618 to heat the air, and then is drawn into the fan 620 through the heating chamber outlet opening 616. The heated air 632 is then flowed upwardly through the branch supply ducts 624 into the interiors of the supply plenum boxes 598. The air entering the plenum supply boxes is diffused upwardly around the baffle plates 628 and is forced out of the corrugation slots 602 in the form of upwardly directed heated air impingement jets 632.

The upwardly directed impingement air jets 634 laterally diffuse, or "plume", before transversely striking the lower side surface of the griddle plate 574. In this manner the upwardly directed jets 632 are caused to at least slightly overlap, thereby very evenly blanketing the underside of the griddle plate to thereby very uniformly transfer heat thereto at an accellerated rate to fry the food items 574 supported thereon. After the jets 632 impinge upon the griddle plate in this manner, a return flow of the air 632 (see FIG. 27) is drawn downwardly between the plenum boxes 598, and rearwardly beneath the griddle plate, and then is returned to the heating chamber 608 through the rear wall openings 610 as previously described to maintain a continuous recirculating flow of heated air through the housing 582.

The unique combination of the thin griddle plate 574 and the diffused transverse flow of impingement jet air which uniformly blankets its lower side surface provides for very rapid heatup of the griddle plate 574, and further provides for extremely even heat distribution across its entire length and width. The griddle plate 574 may be easily and quickly removed from the upper housing opening 578 for purposes of cleaning, and may be quickly reinserted into such opening 578. The illustrated air impingement griddle 570 is very economical to fabricate, and is quite simple and efficient to operate. If desired, the illustrated electric heating coil elements 618 could be replaced with a conventional fuel fired heating system.

Figure 29:
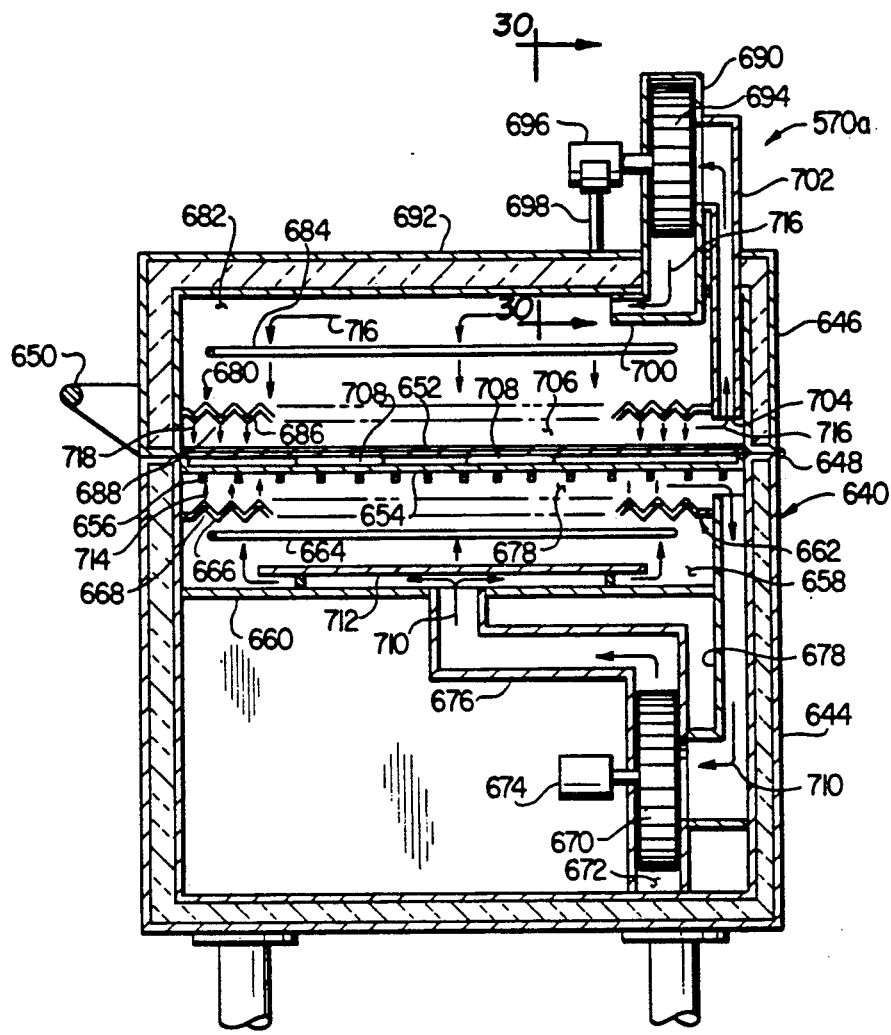
FIG. 29 is a side cross-sectional view through an alternate embodiment of the air impingement griddle.
Figure 30:
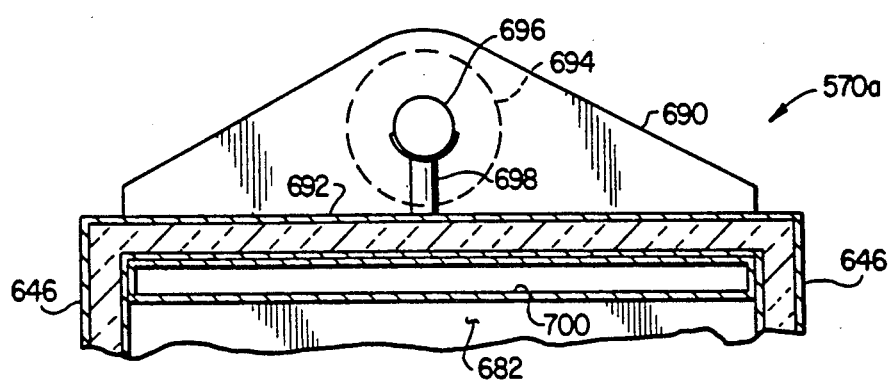
FIG. 30 is a partial cross-sectional view through the alternate griddle embodiment taken along line 30—30 of FIG. 29.

An alternate embodiment 570$_a$ of the griddle 570 is illustrated in FIGS. 29 and 30 and comprises an insulated metal housing 640 having a base section 644 with an open upper end, and a lid section 646 which is pivoted to the upper end of the base section 644, as by a rear mounted hinge element 648, and has an open lower side. The lid section 646 is provided with a front mounted handle 650 which may be used to pivot the lid section about hinge 648 between the illustrated closed position of the lid section and an open position in which the lid section is pivoted in a clockwise direction about the hinge.

An upper griddle plate 652 is suitable secured within the open lower side of the lid section 646, and a lower griddle plate 654 is removably positioned within the open upper end of the housing base section 644 and supported on a spaced series of horizontally extending support plates 656. A lower supply plenum 658 is defined beneath the support plates 656 within the base housing section 644 by a horizontal partition wall 660, and a corrugated lower partition wall 662 positioned above the wall 660. A suitable electric resistance heating coil element 664 is positioned within the lower supply plenum 658. The corrugations of the partition wall 662 are provided with upwardly projecting, generally V-shaped ridges 666 in which are formed spaced series of elongated rectangular air discharge slots 668.

A centrifugal fan impeller 670 is operatively disposed within a fan plenum 672 positioned in the housing base section 644 adjacent the rear wall thereof, the fan 670 being driven by a suitable motor 674. A supply duct 676 is extended between the interior of the lower supply plenum 658 and the outlet of the fan plenum 672, and a return duct 678 intercommunicates the inlet of the fan 670 with the space 678 between the lower corrugated partition wall 662 and the lower griddle plate 654.

An upper corrugated partition wall 680 extends across the interior of the housing lid section 646 above the upper griddle plate 652, and forms within the lid section an upper supply plenum 682 positioned above the corrugated wall 680. A suitable electric resistance heating coil element 684 is positioned within the upper supply plenum 682. The corrugations in the upper partition wall 680 have downwardly projecting, generally V-shaped ridges 686 in which are formed spaced series of elongated rectangular air discharge slots 688.

A fan plenum housing 690 is externally mounted on the upper wall 692 of the lid section 646 adjacent its back side. A centrifugal fan impeller 694 is mounted within the plenum housing 690 and is driven by a motor 696 supported on the upper housing wall 692 by a suitable support member 698. The fan plenum 690 is extended downwardly through the upper housing wall 692 and is connected to an open-ended supply duct 700. A return duct 702 is connected at its upper end to the interior of the fan plenum housing 690, extends downwardly through the upper housing wall 692, and has an open lower end 704 positioned in the space 706 between the upper corrugated partition wall 680 and the upper griddle plate 652.

The griddle 570$_a$ is operated by opening its lid section 646 and depositing food items to be cooked, such as hamburgers 708 on the lower griddle plate 654. The lid section 646 is then closed to bring the upper griddle plate 652 into contact with the upper sides of the hamburgers 708. The fans 670 and 694, and the heating elements 664 and 684 are then energized.

Operation of the lower fan 670 forces air 710 through the supply duct 676 upwardly into the lower supply plenum 658. Air 710 entering the lower supply plenum 658 is horizontally diffused by a baffle plate member 712 and forced upwardly across the heating element 664. The heated air 710 is then forced upwardly through the air discharge slots 668 in the form of spaced series of upwardly directed heated air impingement jets 714. The jets 714 laterally diffuse, or "plume", before transversely striking the underside of the lower griddle plate 64. This pluming of the jets 714 causes them to at least slightly overlap before they transversely strike griddle plate 654. This causes the transversely directed impingement air to evenly blanket the underside of the lower griddle plate, thereby very evenly transferring heat thereto across essentially the entire length and width of the lower griddle plate. After the heated air has transversely impinged upon the lower griddle plate in this manner, the air 710 is drawn downwardly through the return duct 678 and into the lower fan 670 to thereby maintain a constant recirculating flow of heated air through the housing base section 644.

Operation of the upper fan 694 forces air 716 through the supply duct 700 into the upper supply plenum 682 and across the upper heating element 684. The heated air 716 is then forced downwardly through the air discharge slots 688 in the upper corrugated partition wall 680 to form a spaced series of downwardly directed heated air impingement jets 718 which, like the previously described lower jets 714, laterally diffuse and overlap, and transversely strike the upper side surface of the upper griddle plate 652. In this manner, impingement air heat is very evenly spread across such upper side surface of the griddle plate 652 to transfer heat thereto in an extremely uniform pattern and at a highly accelerated rate. After the downwardly directed jets 718 impingement upon the upper griddle plate 652, the deflected air 716 is drawn horizontally across the space 706 and is flowed upwardly through the return duct 702 into the fan 694 to provide a continuous recirculating flow of heated air through the lid section 646 of the housing 640.

From the foregoing, it can be seen that the upper and lower griddle plates 652, 654 which are evenly heated on their inner side surfaces by the impingement air jets 714 and 718 simultaneously fry the hamburgers 708 on their opposite sides in a very efficient, speedy manner.

Air Impingement Grill

Illustrated in FIGS. 31-33 is an air impingement grill 730 which has an insulated metal housing having a base section 732 with an open upper end, and a lid section 734 which has an open lower side and is pivotally secured to the base section 732 by a rear mounted hinge member 736. A vertically extending interior partition wall 738 divides the interior of the housing base section 732 into a front motor chamber 740 and a rear well area 742 into which specially fabricated fan, heating and return housings 744, 746 and 748 may be downwardly and removably inserted through the open upper end of the housing base section 732.

The fan housing 744 has an open upper end 750 and has disposed therein a centrifugal fan impeller 752 which is connectable, via a drive shaft 754 to a motor 756 mounted in the motor chamber 740. The fan impeller 752 is surrounded within the housing 744 by a discharge scroll structure 758, and the rear side wall 760 of the housing 744 is provided with a circular opening 762 which is positioned over the inlet of the fan 752.

The heating housing 746 has a circular opening 764 formed in a right end portion of its front side wall 766 which is aligned with the opening 762 in the fan housing 744, a circular opening 768 formed in a left end portion of its rear side wall 770, and an electric resistance heating element 772 positioned horizontally between the openings 764 and 768.

The return housing 748 has an elongated rectangular inlet collar 774 projecting upwardly from its upper side wall 776, and a circular discharge opening 778 formed in its front side wall 780, the opening 778 being aligned with the opening 768 in the rear wall 70 of the heating housing 746. A drop-in wire mesh basket filter element 782 is operatively received within the inlet collar 774, projects downwardly into the return housing 748, and rests upon a support flange 784 internally secured to the rear wall 786 of the return housing 748. With the housing lid section 734 pivoted to its open position, the filter element 782 may be simply lifted upwardly through the open upper end of the inlet collar 774 for inspection and cleaning purposes.

A downwardly and forwardly sloping corrugated partition wall 788 extends across the interior of the housing lid section 734 and defines with the upper wall 790 of the lid section an upper supply plenum 792. Supply plenum 792 communicates with the open upper end of the supply scroll section 760 via a vertical passage 794 formed in the left side wall 796 of the lid section 734. An upper cooking grate member 798 is supported within the lid section 734, below the corrugated wall 788, for vertical movement within the lid section by pivotally mounted support arms 800. The corrugations in the upper partition wall 788 define downwardly projecting, generally V-shape ridges 802, each of which has formed therein a series of spaced apart elongated rectangular air discharge slots 804.

A forwardly and downwardly sloped lower corrugated partition wall 806 is supported within the open upper end of the housing base section 732 in a downwardly spaced relationship with a lower cooking grate member 808 also supported within the open upper end of the housing base section 732. The lower corrugated partition wall 806 defines the upper boundary of a lower supply plenum 810 which communicates with the open upper end of the fan discharge scroll structure 758. A baffle plate 812 is supported in the supply plenum 810, by small support members 814 in an upwardly spaced relationship with the open upper end 750 of the fan housing 744. The corrugations in the lower partition wall 806 define upwardly projecting, generally V-shaped ridges 816 in which spaced series of elongated rectangular air discharge slots 818 are formed.

During operation of the grill 730, with a food item such as a steak 820 pressed between the upper and lower grate members 798 and 808, the fan 752 forces air 822 upwardly into the upper and lower supply plenums 792 and 810. The air 822 entering the lower supply plenum 810 is laterally diffused by the baffle plate 812 and is forced outwardly through the discharge slots 818 in the form of a series of upwardly directed heated air impingement jets 824. In a similar manner, air 822 entering the upper supply plenum 792 is forced downwardly through the air discharge slots 804 in the form of a series of downwardly directed heated air impingement jets 826. The jets 824, 826 laterally diffuse, or "plume", and slightly overlap before transversely impinging upon the grate members 798, 808 and the opposite side surfaces of the steak 820, thereby evenly blanketing these opposite side surfaces with a uniform pattern of transversely directed impingement air to rapidly and very evenly cook the steak from opposite sides.

After such impingement on opposite sides of the food product being cooked, and the upper and lower support grates, a return flow of air 822 is drawn downwardly through the filter element 782 into the return housing 748. The air 822 then flows outwardly through the circular opening 778 and into the interior of the heating housing 746 through its rear wall opening 768. The air is then drawn across the heating element 772 and flowed outwardly through the heating housing outlet opening 764 into the inlet of the fan 752 for upward discharge through the discharge scroll 758 as previously described. In this manner, a continuous flow of recirculating heating air is maintained within the housing of the grill 730 in a manner very rapidly and evenly cooking the steak 820.

The foregoing detailed description is to be clearly understood as being given by way of illustration and example only, the spirit and scope of the present invention being limited solely by the appended claims.

What is claimed is:

1. A convertible air impingement oven comprising:
a housing having a cooking chamber therein having air inlet and air return openings and an access door;
heated air recirculating means for creating within said housing a recirculating flow of heated air which is forced into and out of said cooking chamber through the air inlet and air return openings; and
a plurality of air plenum box means each selectively insertable through the access door and removably supportable in vertically spaced relationship within said cooking chamber for intercepting a portion of the heated air traversing said cooking chamber from the inlet openings and the return openings and utilizing the intercepted air to create within each of said air plenum box means vertically spaced, opposed, downwardly and upwardly directed relatively high velocity heated air impingement jets which laterally diffuse and at least partially overlap during their vertical travel as air passes into the respective plenum box means, each of said air plenum box means having a food support member horizontally supported therein and positioned to be impinged on opposite sides by the oppositely directed jet flows in the air plenum box means, and a side wall opening through which a food item may be placed on and removed from the support member, the opposing jet flows in each air plenum box means operating to evenly blanket upper and lower sides of the support member with vertically directed heating air, whereby a food item placed on the support member is evenly cooked on opposite sides thereof at an accelerated rate regardless of the position of the food item on the support member.

2. The oven of claim 1 wherein:
each of said food support members is a metal cooking rack.

3. The oven of claim 1 wherein:
each of said air plenum box means has vertically spaced upper and lower horizontal side walls in which spaced series of air inlet openings are formed to transfer heated air into the interior of the air plenum box means and form therein said vertically opposed upper and lower spaced series of relatively high velocity heated air impingement jets.

4. The oven of claim 3 wherein:
each of said upper and lower side walls is corrugated to respectively form therein downwardly and upwardly projecting ridges, and said air inlet openings are formed in said ridges and have generally rectangular configurations.

5. The oven of claim 3 wherein:
said air plenum box means have outlet openings therein,
said housing has a fan chamber therein, and
said heated air recirculating means include a fan impeller in said fan chamber, said impeller being drivable to flow heated air sequentially from said fan chamber into said cooking chamber, from said cooking chamber into said air plenum box means through said air inlet openings therein, and outwardly through said outlet openings back into said fan chamber.

6. A convertible air impingement oven comprising:
a housing having a cooking chamber therein for cooking large or small food items having opposite side walls, top and bottom walls, a rear wall, and a front access door;
slide support means on the side walls for slidably receiving food support members and/or plenum boxes;
a plurality of vertically spaced plenum means selectively positionable within said cooking chamber for internally receiving heated, pressurized air, at a food cooking temperature, from a source thereof and vertically discharging the received air into said cooking chamber to form, between each vertically adjacent pair of said plenum means, opposed series of vertically directed, relatively high velocity heated air impingement jets which laterally diffuse and at least partially overlap during their vertical travel;
a plurality of food support members each positionable between a vertically adjacent pair of said plenum means in spaced relationship therewith to be impinged on opposite sides by the oppositely directed jet flows emanating from the plenum means pair, each opposed jet series pair evenly blanketing the opposite sides of its associated food support member with heating air, whereby a food item placed on the food support member is evenly cooked on opposite sides thereof at an accelerated rate regardless of the location of the food item on the food support member; and
heated air recirculating means for creating within said housing a recirculating flow of heated air which sequentially flows into the interiors of said plenum means, is discharged from said plenum means in the form of said air impingement jets, is flowed outwardly from said cooking chamber, and is then returned to the interiors of said plenum means.

7. The oven of claim 6 wherein:
said food support members are metal cooking racks.

8. The oven of claim 6 wherein:
each vertically adjacent pair of said plenum means have facing side walls which are corrugated to form ridges therein which project toward the food support member positioned therebetween, said ridges having spaced series of generally rectangular air discharge openings formed therein.

9. The oven of claim 6 wherein:
said housing has a return chamber separated from said cooking chamber by a first dividing wall, said first dividing wall having a vertically spaced series of return openings formed therethrough, each of said return openings being positioned vertically between a vertically adjacent pair of said plenum means,
said housing has a second dividing wall which forms a supply chamber communicating with the interiors of said plenum means through a vertically spaced series of inlet openings formed in said second dividing wall, and
said heated air recirculating means include fan means positioned in said return chamber and drivable to force heated air sequentially into said supply plenum, into said plenum means through said inlet openings, outwardly through said plenum means into said cooking chamber, into said return chamber through said return openings, into said fan means, and through said fan means into said supply plenum.

10. The oven of claim 6 wherein:
said plenum means comprise four vertically spaced plenum box structures, each vertically adjacent pair of said plenum box structures having opposed upper and lower side walls in which spaced series of air discharge openings are formed.

11. A hot air impingement oven for cooking food items of different sizes which comprises:
a cooking chamber defined by top, bottom, opposite side, and rear walls and a closure door forming the front wall for cooking food items of different sizes,
hot air recirculating means for heating and recirculating air into and out of the cooking chamber through at least one inlet opening in one of the walls of the cooking chamber and at least one return opening in another of the walls of the cooking chamber for establishing hot air flow within the cooking chamber for accelerating the cooking rate of food items placed within the cooking chamber;
means within the chamber for selectively supporting grill means for supporting large food items, plenum boxes, or grill means for small food items within the cooking chamber;
at least one plenum box removably placeable within the cooking chamber for intercepting the air flow through one of the openings and forming at least one substantially uniform blanket of relatively high velocity jets of hot air over a substantial area within the cooking chamber; and
at least one of the means for supporting food items to be cooked within the cooking chamber being located to position the food items so as to be impinged uniformly by the blanket of relatively high velocity jets of hot air.

12. The hot air impingement oven of claim 11 wherein:
there are a plurality of inlet openings in one wall of the cooking chamber,
there are a plurality of means for supporting plenum boxes and a plurality of plenum boxes each in fluid communication with one of the inlet openings, the plenum boxes being disposed generally horizontally and in vertically spaced relationship to produce upwardly and downwardly directed blankets of relatively high velocity jets of hot air, and
grill means selectively insertable between the plenum boxes in vertically spaced relationship to each so that food supported thereon will be substantially uniformly impinged by the respective blankets of relatively high velocity jets of hot air as air from the inlet openings is caused to pass into the plenum boxes and then be directed from the plenum boxes and impinged on the food, then passed through the return opening to the hot air circulating means.

13. The hot air impingement oven of claim 11 wherein:
there are a plurality of outlet openings in one wall of the cooking chamber,
there are a plurality of means for supporting plenum boxes and a plurality of plenum boxes removably supported thereon each in fluid communication with an outlet opening,
each plenum box including upper and lower means for forming downwardly and upwardly directed blankets of relatively high velocity jets of hot air as air from the interior of the cooking chamber passes into the plenum boxes and then through the respective outlet openings,
each plenum box including a rack disposed within the plenum box for supporting food to be cooked within the plenum box and being open at the front end so that food can be placed on or removed from the rack through the closure door of the cooking chamber.

* * * * *